United States Patent
Wang et al.

(10) Patent No.: US 8,787,426 B2
(45) Date of Patent: Jul. 22, 2014

(54) FINGER PLACEMENT IN MULTI-STAGE INTERFERENCE CANCELLATION

(75) Inventors: Yi-Pin Eric Wang, Fremont, CA (US); Stephen Grant, Pleasanton, CA (US); Ning He, Sollentuna (SE); Niklas Johansson, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 215 days.

(21) Appl. No.: 13/333,703

(22) Filed: Dec. 21, 2011

(65) Prior Publication Data
US 2013/0077657 A1    Mar. 28, 2013

Related U.S. Application Data

(60) Provisional application No. 61/540,144, filed on Sep. 28, 2011.

(51) Int. Cl.
*H04B 1/00* (2006.01)

(52) U.S. Cl.
USPC ........... 375/148; 375/147; 375/150; 375/144; 375/142

(58) Field of Classification Search
USPC .......................... 375/148, 147, 150, 144, 142
See application file for complete search history.

(56) References Cited

U.S. PATENT DOCUMENTS

| | | | |
|---|---|---|---|
| 6,363,103 B1 | 3/2002 | Buehrer et al. | |
| 6,667,964 B1 | 12/2003 | Seki et al. | |
| 6,683,924 B1 | 1/2004 | Ottosson et al. | |
| 6,922,434 B2 | 7/2005 | Wang et al. | |
| 2001/0028677 A1 | 10/2001 | Wang et al. | |
| 2005/0195889 A1 | 9/2005 | Grant et al. | |
| 2005/0201447 A1* | 9/2005 | Cairns et al. | 375/148 |
| 2005/0249269 A1* | 11/2005 | Tomasin et al. | 375/148 |
| 2006/0251156 A1 | 11/2006 | Grant et al. | |
| 2006/0268962 A1 | 11/2006 | Cairns et al. | |
| 2007/0147329 A1 | 6/2007 | Soriaga et al. | |
| 2007/0147481 A1 | 6/2007 | Bottomley et al. | |
| 2008/0063033 A1* | 3/2008 | Khayrallah | 375/148 |
| 2008/0130719 A1 | 6/2008 | Bottomley et al. | |
| 2008/0304554 A1 | 12/2008 | Fulghum et al. | |
| 2009/0186645 A1 | 7/2009 | Jaturong et al. | |
| 2009/0257477 A1 | 10/2009 | Khayrallah et al. | |
| 2011/0222618 A1 | 9/2011 | Huss et al. | |

FOREIGN PATENT DOCUMENTS

| | | |
|---|---|---|
| EP | 1233565 A2 | 8/2002 |
| EP | 1259001 A1 | 11/2002 |
| WO | 02080432 A2 | 10/2002 |
| WO | 2006-030314 A1 | 3/2006 |
| WO | 2007-051111 A1 | 5/2007 |

OTHER PUBLICATIONS

Office Action dated Jun. 21, 2013 in related U.S. Appl. No. 13/402,297 (7 pages).

(Continued)

*Primary Examiner* — Kabir A Timory
(74) *Attorney, Agent, or Firm* — Nixon & Vanderhye, P.C.

(57) ABSTRACT

In a receive node of a wireless network, an iterative multi-user multi-stage interference cancellation receiver is used. After each stage of interference cancellation, interference characteristics change. An adaptive finger placement strategy is used in which after each stage of interference cancellation, finger delays and combining weights of the receiver are adapted to reflect the changed interference characteristics.

34 Claims, 25 Drawing Sheets

(56) References Cited

OTHER PUBLICATIONS

International Search Report and Written Opinion in International Application No. PCT/SE2012/050638 dated Apr. 23, 2013 (17 pages total).

Kim-Chyan Gan, "Maximum Ratio Combining for a WCDMA Rake Receiver", Freescale Semiconductor Application Note, Rev. 2, Nov. 2004 (8 pages total).

International Search Report and Written Opinion in International Application No. PCT/SE2012/051032 dated Apr. 26, 2013 (17 pages total).

R1-090919, TSG-RAN WG1 #56, "Performance prediction of turbo-SIC receivers for system-level simulations", Orange, Nokia, Nokia Siemens Networks, Texas Instruments, Athens, Greece, Feb. 9-13, 2009 (11 pages).

International Search Report and Written Opinion mailed Sep. 9, 2013 in corresponding International Application No. PCT/SE2012/050920 (15 pages total).

Office Action dated Sep. 17, 2013 in related U.S. Appl. No. 13/333,478 (10 pages).

International Preliminary Report on Patentability w/transmittal in International Application No. PCT/SE2012/051032 dated Apr. 10, 2014 (13 pages total).

\* cited by examiner

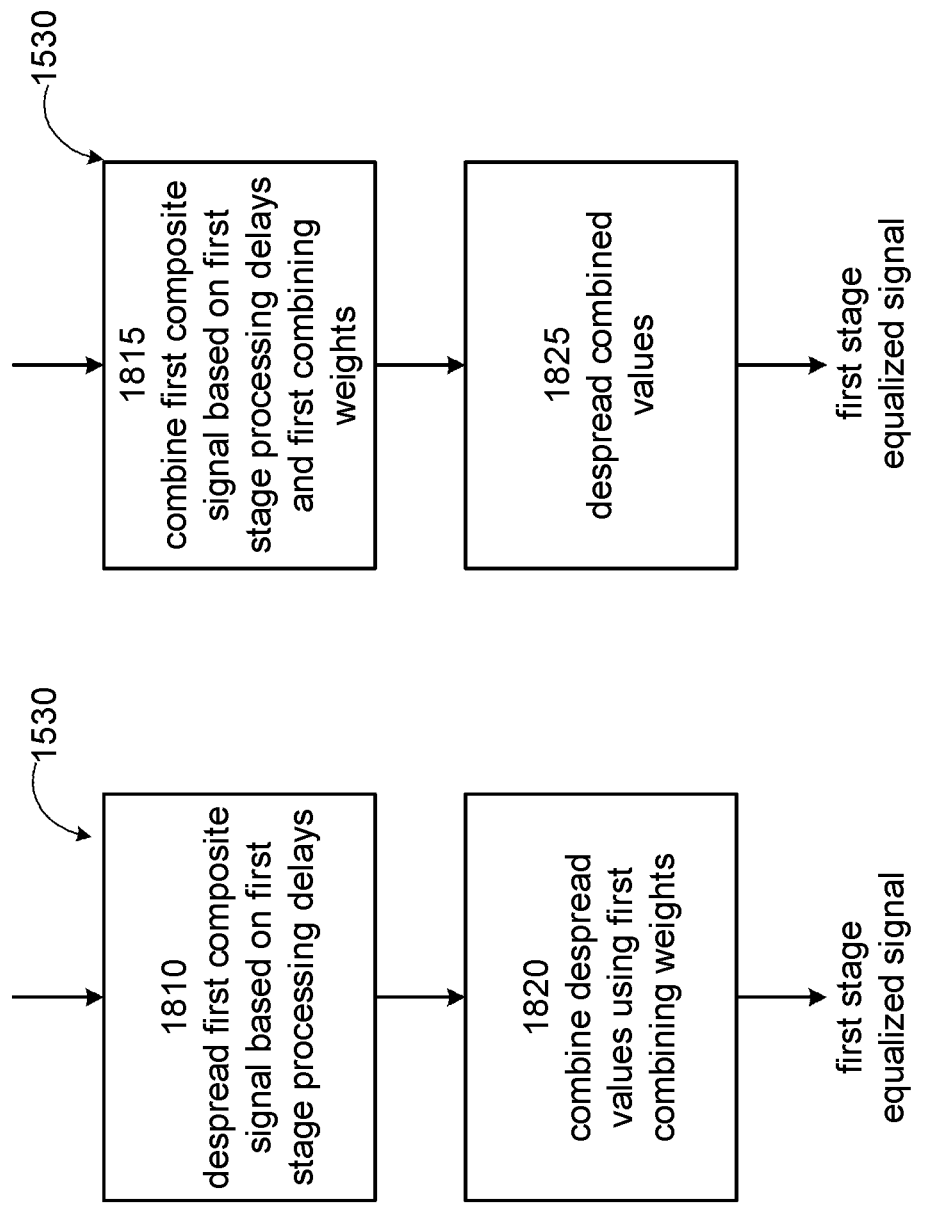

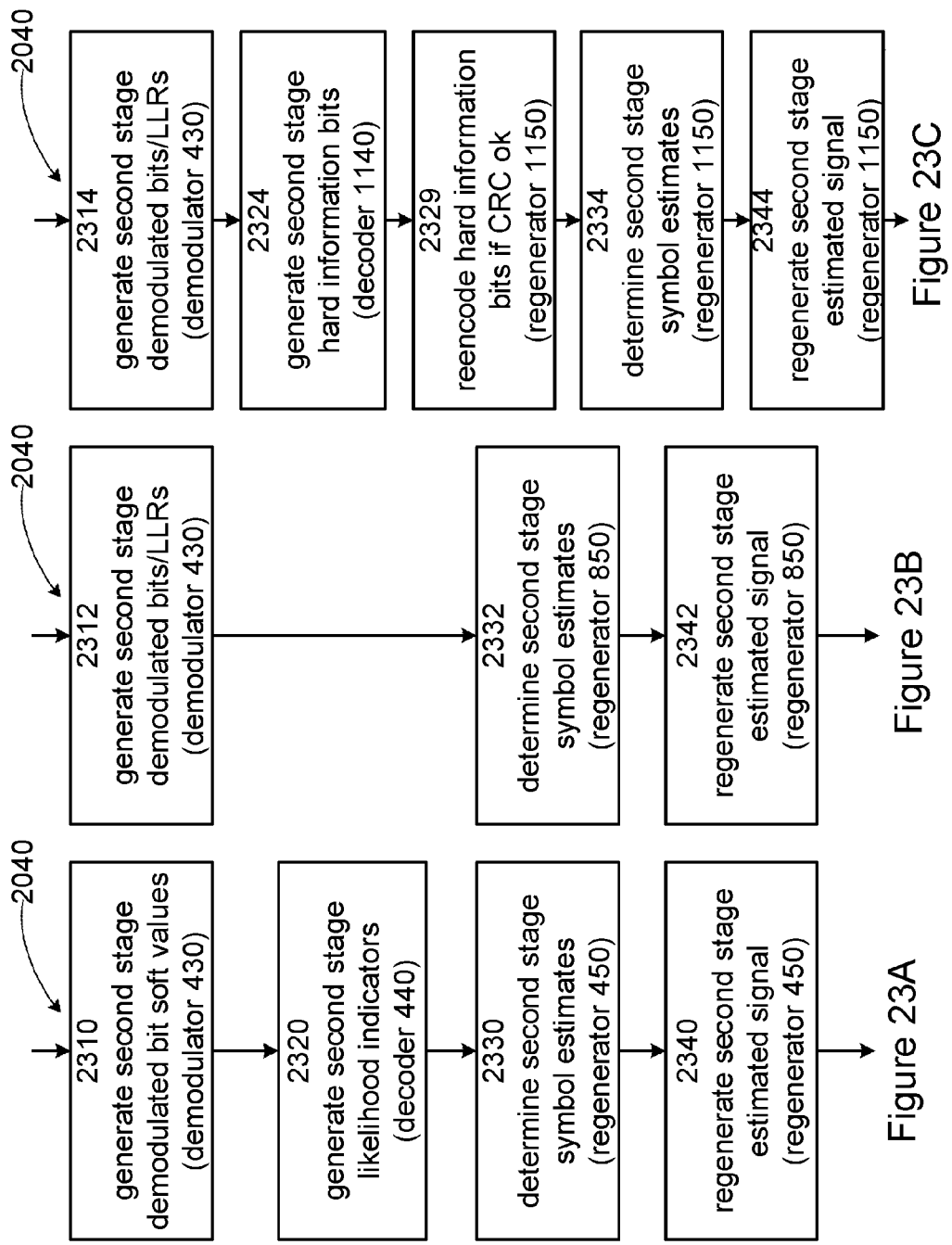

FINGER PLACEMENT IN MULTI-STAGE INTERFERENCE CANCELLATION

RELATED APPLICATION

This application may be related, at least in part, to U.S. patent application Ser. No. 13/333,478 entitled "IMPAIRMENT COVARIANCE AND COMBINING WEIGHT UPDATES DURING ITERATIVE TURBO INTERFERENCE CANCELLATION RECEPTION" (companion application) filed Dec. 21, 2011, which is incorporated herein by reference in its entirety. This application also claims priority and benefit of U.S. provisional application 61/540,144 entitled "MULTI-STATE TURBO EQUALIZATION AND INTERFERENCE CANCELLATION RECEIVER FOR WIRELESS SYSTEMS" filed on Sep. 28, 2011, which is incorporated herein by reference in its entirety.

TECHNICAL FIELD

Technical field of present disclosure relates to adapting finger placement strategy according to updated interference characteristics after interference cancellation in a stage of a multi-stage interference cancellation.

BACKGROUND

In a turbo interference cancellation receiver, interference such as inter-symbol-interference (ISI), code-division multiplexing (CDM) interference, and spatial-multiplexing interference due to single-user (SU) or multi-user (MU) MIMO can be cancelled based on soft estimates of the interfering symbols. The soft symbol estimates are formed using the decoder outputs, which describe the likelihood ratios of the bits that are used to determine these interfering symbols. Each likelihood ratio can be converted to bit probability (i.e., probability of bit having value 0 or 1). After cancellation, the received signal is re-equalized using new combining weights, which reflect a new impairment covariance matrix due to interference cancellation. The equalized symbols are demodulated and converted to bit soft values, which are used by the various decoders, one for each user, codeword or MIMO stream, to produce updated bit likelihood ratios. This iterative process of cancellation, equalization, demodulation, and decoding is referred to as turbo interference cancellation (turbo-IC).

One key aspect of turbo-IC implementation is adapting the equalizer formulation to the residual impairment characteristics. In some radio base stations (RBSs), despread-level equalization such as G-Rake or G-Rake+ is used. The received signal is descrambled and despread for a symbol of interest and for a number of finger delays. The multiple despread values are combined according to a set of combining weights, which is dependent on the impairment covariance matrix. In the G-Rake approach, an estimate of the code-averaged impairment covariance matrix is obtained by parametrically formulating a self-interference covariance matrix using the estimated own-signal propagation characteristics while interference from other interfering signals and thermal noise is modeled as additive white Gaussian noise (AWGN). In the G-Rake+ approach, an estimate of the code-averaged impairment covariance matrix can be obtained by observing the despread values on one or more unoccupied codes. Previous studies have confirmed that such a practical approach captures the overall interference characteristics more accurately and results in good performance relative to a G-Rake+ receiver that has perfect knowledge about the impairment covariance matrix. Another commonly used receiver in a CDMA system is Rake receiver which models overall interference as AWGN.

Finger delays (or finger placement) and combining weights are two important design parameters for a G-Rake+ equalizer. In a practical iterative multi-stage interference-cancellation based multiuser detector (MUD), or turbo-IC receiver, interference characteristics can change as a portion of the interference is cancelled. It would thus be desirable to adapt the finger placement strategy to the changing interference characteristics as interferences are canceled.

SUMMARY

A non-limiting aspect of the disclosed subject matter is directed to a method performed in a receive node of a communication network to perform a first stage processing a symbol of interest contained in a first composite signal, and to perform a second stage processing the same symbol of interest contained in a second composite signal. The first stage processing comprises determining one or more first stage interference characteristics based on the first composite signal, determining one or more first stage processing delays based on the first stage interference characteristics, performing a first stage despreading and combining of the first composite signal based on the first stage processing delays to generate a first stage equalized signal, determining a first stage estimated signal based on the first stage equalized signal, and canceling the first stage estimated signal from the first composite signal to generate an interference-reduced version of the first composite signal. The second stage processing comprises determining one or more second stage processing delays, and performing a second stage despreading and combining of the second composite signal based on the second stage processing delays. The second composite signal is based on the interference-reduced version of the first composite signal.

Another non-limiting aspect of the disclosed subject matter is directed to a receiver of a receive node of a communication network. The receiver comprises a plurality of chains, in which each chain is structured to process a symbol of interest contained in a first composite signal in a first stage, and to process the same symbol of interest contained in a second composite signal in a second stage. Each chain of the receiver comprises an equalizer, a demodulator, a signal regenerator, and an interference canceller. In the first stage, the equalizer determines one or more first stage interference characteristics based on the first composite signal, determines one or more first stage processing delays based on the first stage interference characteristics, and performs a first stage despreading and combining of the first composite signal based on the first stage processing delays to generate a first stage equalized signal. Also in the first stage, the signal regenerator determines a first stage estimated signal based on the first stage equalized signal, and the interference canceller cancel the first stage estimated signal from the first composite signal to generate an interference-reduced version of the first composite signal. In the second stage, the equalizer determines one or more second stage processing delays, and performs a second stage despreading and combining of the second composite signal based on the second stage processing delays. The second composite signal is based on the interference-reduced version of the first composite signal.

Yet another non-limiting aspect of the disclosed subject matter is directed to a non-transitory computer storage medium which has stored therein programming instructions.

When a computer executes the programming instructions, the computer executes the method performed in the receive node as described above.

DESCRIPTION OF THE DRAWINGS

The foregoing and other objects, features, and advantages of the disclosed subject matter will be apparent from the following more particular description of preferred embodiments as illustrated in the accompanying drawings in which reference characters refer to the same parts throughout the various views. The drawings are not necessarily to scale.

FIGS. 18A and 18B illustrate flow charts of example processes perform first stage despreading and combining;

FIGS. 23A, 23B and 23C illustrate flow charts of example processes to estimate signals in a second stage.

DETAILED DESCRIPTION

Figure 1:
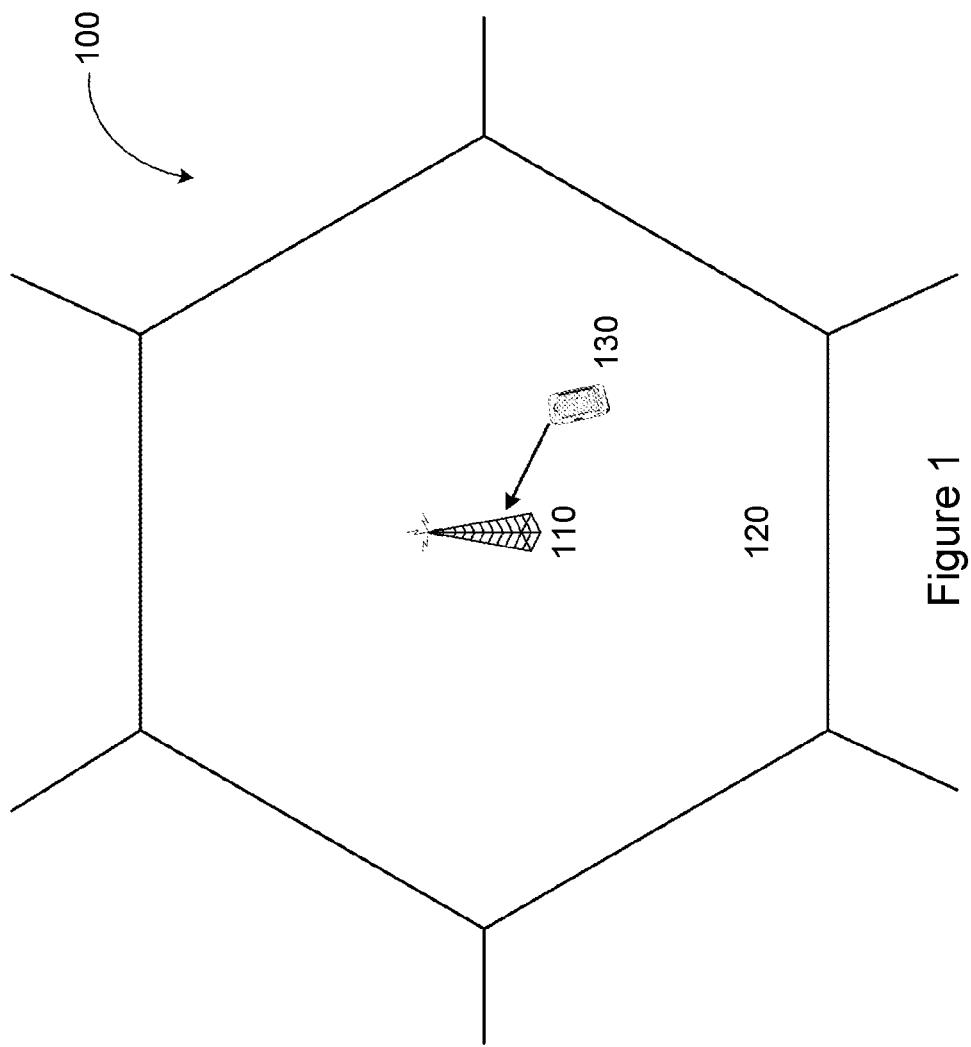
FIG. 1 illustrates an example scenario of a wireless network in which mobile terminals and base station communicate with each other.

For purposes of explanation and not limitation, specific details are set forth such as particular architectures, interfaces, techniques, and so on. However, it will be apparent to those skilled in the art that the technology described herein may be practiced in other embodiments that depart from these specific details. That is, those skilled in the art will be able to devise various arrangements which, although not explicitly described or shown herein, embody the principles of the described technology.

In some instances, detailed descriptions of well-known devices, circuits, and methods are omitted so as not to obscure the description with unnecessary details. All statements herein reciting principles, aspects, embodiments and examples are intended to encompass both structural and functional equivalents. Additionally, it is intended that such equivalents include both currently known equivalents as well as equivalents developed in the future, i.e., any elements developed that perform same function, regardless of structure.

Thus, for example, it will be appreciated that block diagrams herein can represent conceptual views of illustrative circuitry embodying principles of the technology. Similarly, it will be appreciated that any flow charts, state transition diagrams, pseudo code, and the like represent various processes which may be substantially represented in computer readable medium and executed by a computer or processor, whether or not such computer or processor is explicitly shown.

Functions of various elements including functional blocks labeled or described as "processors" or "controllers" may be provided through dedicated hardware as well as hardware capable of executing associated software. When provided by a processor, functions may be provided by a single dedicated processor, by a single shared processor, or by a plurality of individual processors, some of which may be shared or distributed. Moreover, explicit use of term "processor" or "controller" should not be construed to refer exclusively to hardware capable of executing software, and may include, without limitation, digital signal processor (shortened to "DSP") hardware, read only memory (shortened to "ROM") for storing software, random access memory (shortened to RAM), and non-volatile storage.

In this document, 3GPP terminologies—e.g., WCDMA, HSPA—are used as examples for explanation purposes. Note that the technology described herein can be applied to non-3GPP standards. Thus, the scope of this disclosure is not limited to the set of 3GPP wireless network systems and can encompass many domains of wireless network systems. Also, a base station (e.g., RBS, NodeB, eNodeB, eNB, etc.) will be used as an example of a network node in which the described method can be performed. However, it should be noted that the disclosed subject matter is applicable to any node, such as relay stations, that receive wireless signals. Also without loss of generality, mobile terminals (e.g., UE, mobile computer, PDA, etc.) will be used as examples of wireless terminals that communicate with the base station.

FIG. 1 illustrates an example scenario of a wireless network 100 in which a mobile terminal 130 and a base station 110 (corresponding to cell 120) communicate with each other. In the downlink, the base station 110 is a transmit node and the mobile terminal 130 is a receive node. In uplink, the situation is reversed. For simplicity, one mobile terminal 130 and one base station 110 are shown. However, this should not be taken to be limiting. The concepts discussed can be expanded and applied to networks with multiple base stations and mobile terminals.

Figure 2:
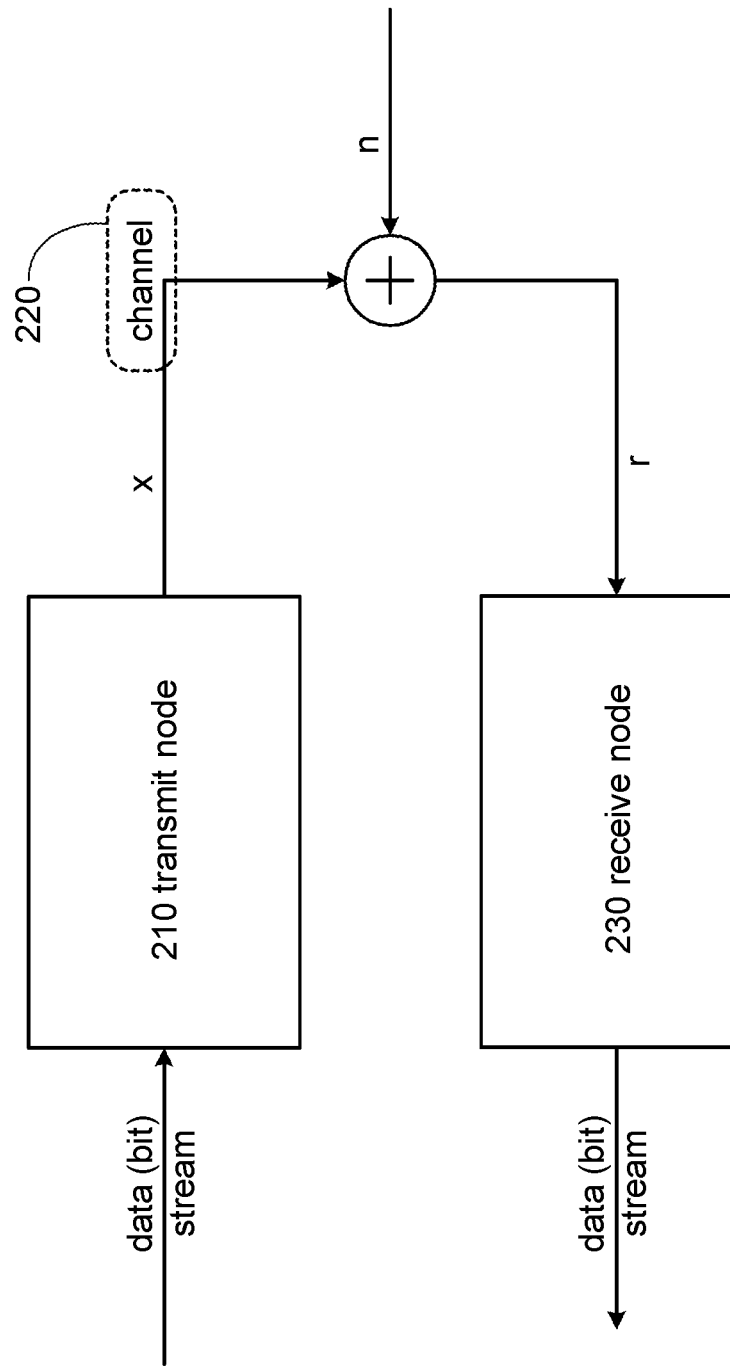
FIG. 2 illustrates a simplified block diagram of a communication link between a transmit node and a receive node.

FIG. 2 is a simplified block diagram of a communication link between a transmit node 210 and a receive node 230. The transmit node 210 performs operations on the data stream, which can be a stream of bits, to transmit a corresponding signal x through a channel 220. While it is recognized that the signal x transmitted from the transmit node 210 is carried by RF carriers, for the purposes of this discussion, equivalent baseband signaling is assumed. Thus, it can be said that baseband signal x is transmitted from the transmit node 210 through the channel 220 which can be dispersive, non-dispersive, frequency-selective, or frequency-flat. The signal r received at the receive node 230 through the channel 220 is a composite of some version of the transmitted signal x and noise n. That is, the received signal r can be expressed as follows:

$$r = \hat{x} + n \qquad (1)$$

where $\hat{x}$ represents a version of the transmitted signal x received at the receive node 230. The noise n can be viewed as including any unwanted signals including interferences (from other cells, mobile stations, thermal noise, etc.) as well as interferences described above.

The receive node 230 is structured to perform enhancement processing on the received signal r to increase the effective SINR of the communication link between transmit node 210 and the receive node 230. Generally, enhancement processing can be viewed as amplifying the transmitted signal x and/or reducing the noise n. The receive node 230 reproduces the data (bit) stream originally supplied to the transmit node 210.

As noted before, in an iterative multi-stage interference-cancellation, the interference characteristics can change as a portion of the interference is cancelled. In one aspect of the disclosed subject matter, the finger placement strategy is adapted according to the new interference characteristics after interference cancellation. More broadly, processing delays are determined as the interference characteristics change, and the despreading and combining of the signal is performed based on the processing delays.

As indicated above, a key aspect of turbo-IC implementation is adapting the equalizer formulation to the residual impairment characteristics during each stage, and that a despread-level equalization such as G-Rake+ can be used in which the received signal is descrambled and despread for a symbol of interest and for a number of finger placements.

Finger placement for a G-Rake receiver is described in U.S. Pat. No. 6,683,924 which is herein incorporated by reference in its entirety. G-Rake fingers can include energy-collecting and interference-suppressing fingers. The energy-collecting fingers can be determined by multipath delays, whereas the interference-suppressing fingers can be determined by the delays of the energy-collecting fingers as well as the delay differentials of the multipaths. The interference-suppressing fingers can be determined by impairment correlations. A first set of fingers can be used to measure impairment correlation. A delay can be chosen as an interference-suppressing finger when the impairment correlation between such a delay and that of an already chosen finger (energy-collecting or interference-suppressing) is high.

Finger placements (or finger delays) and combining weights are important design parameters for an equalizer such as the G-Rake or G-Rake+ equalizer. Since the interference characteristics can change as a portion of the interference is cancelled in an interference cancellation stage, it would be desirable to adapt the finger placements and/or combining weights to the different residual impairment characteristics during different stages of the turbo-IC receiver.

Thus, in one non-limiting aspect, the finger placement strategy is adapted according to the new interference characteristics after interference cancellation. Interference may be characterized by—among other things—its correlation function, or by residual interference power levels, each associated with an interfering signal.

In the case of soft symbol based cancellation, the residual interference power level may be determined by the variance of the soft symbols. For example, in a first stage of turbo-IC iteration, finger placement can be determined by own-signal propagation characteristics to address self interference. In a later stage, finger placement may also be determined by the propagation characteristics of another interfering signal which could become dominant after other interfering signals are cancelled. The dominant interfering signal in this case can be a signal that is not included in turbo-IC or a signal that is not removed very much by turbo-IC due to poor decoding outcome.

In another aspect, the residual interference in a late turbo-IC stage may become white as all the strong colored interference is removed. In this case, the finger placement strategy may become a Rake, i.e. no extra interference-suppressing fingers are needed.

Note that one or more aspects described herein may be applied to any other iterative, multi-stage interference cancellation (IC) schemes with G-Rake+ equalization, such as iterative hard or soft pre-decoding IC for which the regenerated signal for cancellation is based on symbol estimates from the demodulator instead of the channel decoder. In addition, one or more aspects can be applied to iterative, multi-stage hard post-decoding interference cancellation when the regenerated signal for cancellation is based on symbol estimates from re-encoding the binary decoded information bits after the decoded information bits pass the cyclic redundancy check (CRC).

Figure 3:
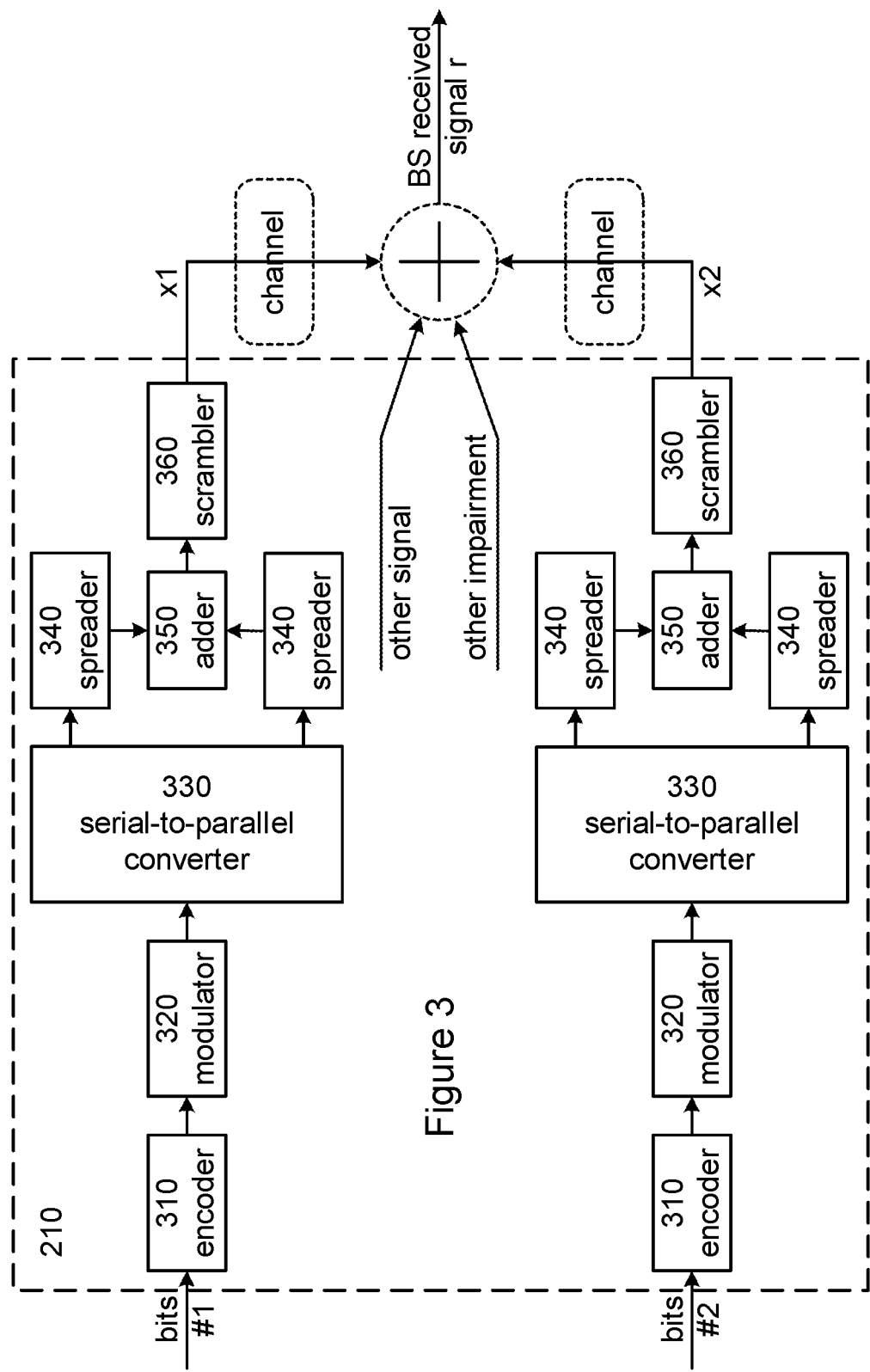
FIG. 3 illustrates an example diagram representing a model of a WCDMA/HSPA uplink transmission and reception.

For a discussion regarding finger placement strategy, a block diagram representing a model of a WCDMA/HSPA uplink transmission and reception illustrated in FIG. 3 is used. In this instance, the mobile terminal 130 is the transmit node and the base station 110 is the receive node. This also should not be taken to be limiting. In the downlink direction, it is contemplated that some or all mobile terminals 130 may also perform signal enhancement processing to which one or more aspects of the disclosed subject matter are applicable.

The model illustrated in FIG. 3 may be viewed to as a being an instance of the transmit node 210 shown in FIG. 2. In FIG. 3, information bits of a first signal (labeled "bits #1") are encoded by an encoder 310 to produce encoded bits, which are modulated by a modulator 320 to produce transmitted symbols. For ease of reference, the information bits of the first signal (bits #1) will be referred to as the first information stream. Then it can be said that the encoder 310 encodes the first information stream to produce a first encoded information stream, which is modulated by the modulator 320 to produce a first symbol stream. The first symbol stream may be mapped by a serial-to-parallel converter 330 to one or multiple channelization codes. FIG. 3 illustrates a case of transmitting two channelization codes for the first symbol stream. However, the number of channelization codes can be one or more than one.

The transmitted symbols in the first symbol stream can be separately spread by spreaders 340 on each of the channelization codes to produce spread signals corresponding to the channelization codes, and an adder 350 can sum the spread signals produced by the spreaders. The summed spread signals from the adder 350 can be scrambled by a scrambler 360 to produce a first signal $x_1$ which is transmitted. In practice, other data and control channels can be mapped on additional channelization codes. But for the purposes of this discussion and without loss of generality, these signals are omitted.

The first transmitted signal $x_1$ is sent through a radio channel to the receive node 230 (e.g., a base station). The channel may be dispersive. FIG. 3 also shows a second signal $x_2$, generated in a similar fashion to the first signal $x_1$, as being transmitted to the receive node 230. The signals $x_1$ and $x_2$ can be transmitted from the same user, but via different transmit antennas in the case of SU-MIMO (with the same scrambling code), or from different users in the case of multi-user scheduling or MU-MIMO (with different scrambling codes). It should be noted that there can be more than two signals generated and transmitted to the receive node 230 and the concepts discussed herein can be generalized to any number of such generated signals. But for ease of explanation, only two are illustrated.

The base station receives a signal r, which includes some versions of $x_1$ and $x_2$ (denoted respectively as $\hat{x}_1$ and $\hat{x}_2$) along with other signals (e.g., control channels, low-rate data channels), and other impairments (other-cell interference, thermal noise). That is, the signal r received at the base station can be expressed as follows:

$$r = \hat{x}_1 + \hat{x}_2 + n \quad (2)$$

Again, the noise signal n can be viewed as including any unwanted signals including interferences. Just as an aside, the received signal r can be generally expressed as follows:

$$r = \sum_{k=1}^{m} \hat{x}_k + n \quad (3)$$

where m represents the number of signals transmitted to the receive node 230.

Figure 4:
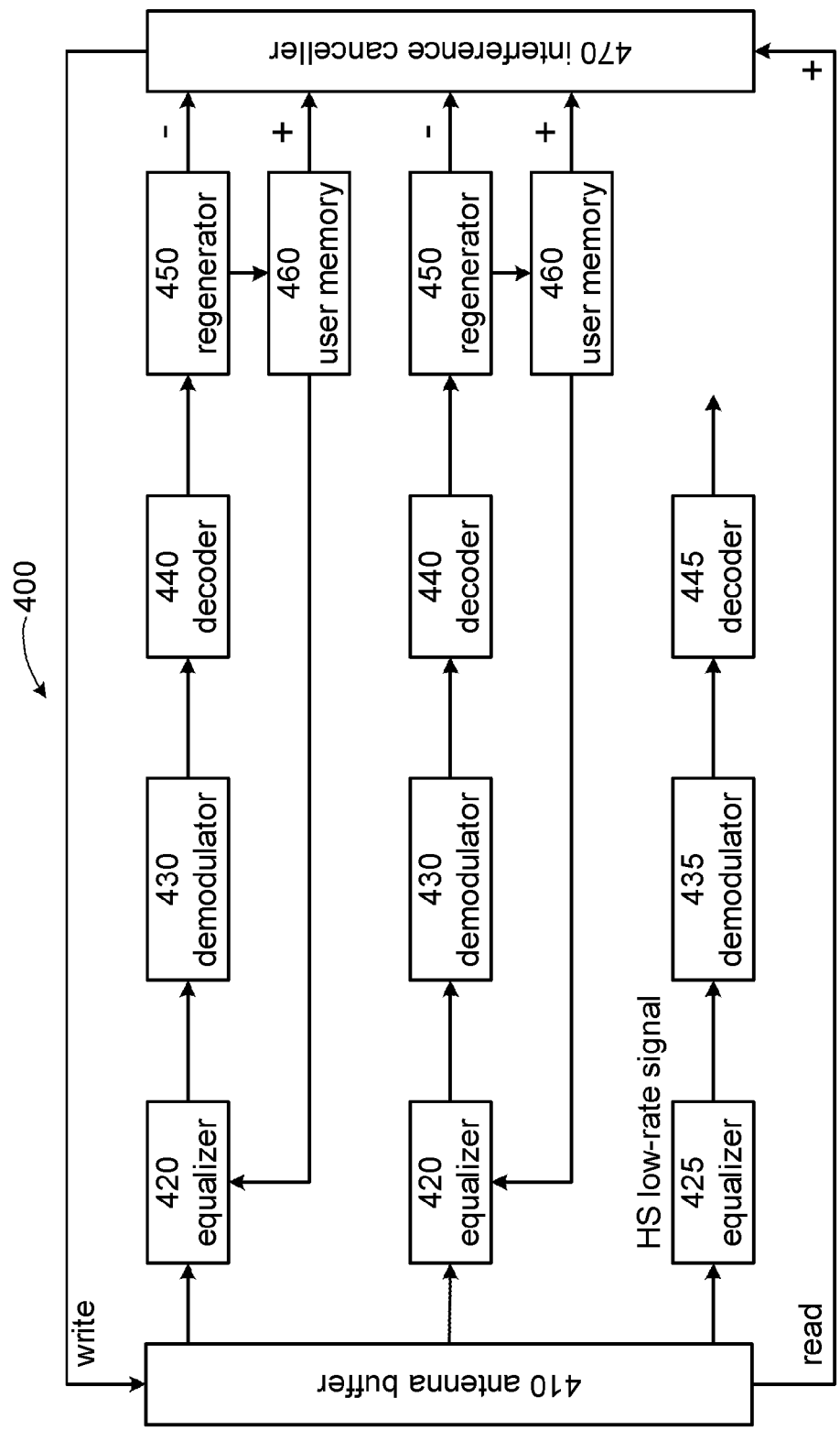
FIG. 4 illustrates an example embodiment of an iterative receiver.

A high-level architecture of an example turbo-IC receiver 400 capable of recovering the information bits from the first and second signals generated in FIG. 3 is shown in FIG. 4. For brevity, the turbo-IC receiver 400 will simply be referred to as the "receiver" 400. The receiver 400 comprises an antenna buffer 410 structured to store the received signal at the first stage or an interference reduced version of the received signal at later stages, one or more equalizers 420 structured to equalize signals from the antenna buffer 410, one or more demodulators 430 structured to demodulate the equalized signals, one or more decoders 440 structured to decode the demodulated signals, one or more signal regenerators 450 structured to regenerate signals, one or more user memories 460 structured to store the regenerated signals and/or symbols of different stages, and an interference canceller 470 structured to cancel interferences in each stage. The receiver 400 can also include an equalizer 425, a demodulator 435 and a decoder 445 to process HS low-rate signals. These can be same or different from the equalizers 420, the demodulators 430 and the decoders 440. It should be noted that in actuality, these can be any signals that are not processed in an iterative manner. As such, they can be of any rate, not just low rate. But for ease of reference, they are referred to as "HS low-rate signal" in the Figures.

The receiver 400 can be viewed as being included in the receive node 230 illustrated in FIG. 2. In the uplink transmission, the receiver 400 can be a receiver of a base station, and in the downlink transmission, it can be a receiver of a mobile terminal. As expressed in equation (2) above, the receive node 230 receives a signal r which is a combination of signals as $\hat{x}_1$ and $\hat{x}_2$ (versions of originally transmitted first and second signals $x_1$ and $x_2$) plus other signals and impairments or a noise signal n.

In FIG. 4, two chains of equalizer 420, demodulator 430, decoder 440, signal regenerator 450 and user memory 460 are shown. Each chain processes the received signal r for the signal of interest. For example, the signal of interest for the top chain (also referred to as the first chain) processes can be the first signal $x_1$, and the signal of interest for the second (middle) chain can be the second signal $x_2$. While two chains are shown, this is not a limitation. The number of chains can be any number.

For each signal of interest, e.g., the first signal $x_1$, the equalizer 420 equalizes the signal stored in the antenna buffer 410 (which can be the received signal r or the interference reduced version of the signal of interest) to produce a stream of equalized symbols in that signal of interest. For example, the first chain equalizer 420 in FIG. 4 produces a stream of equalized symbols corresponding to the first symbol stream produced by the top modulator 320 in FIG. 3. Generally, the equalized symbols of the stream produced by the equalizer 420 can be viewed as estimates of the symbols in the symbol stream produced by a corresponding modulator 320. It can be said that from the perspective of a particular symbol of interest, the equalizer 420 equalizes that symbol. The same equalizer 420 also equalizes other symbols in the same symbol stream (i.e., of the same signal) which can be sources of own signal interference. A different equalizer 420 equalizes symbols streams of other streams (i.e., of other signals) which are other interference sources to the symbol of interest.

The demodulator 430 can demodulate the equalized symbol to produce a demodulated data. In one example, this can be a number of encoded bit soft values corresponding to the symbol of interest. The decoder 440 can decode the demodulated data to produce likelihood indicators. The decoder 440 outputs estimates of the bits inputted to the encoder 310 in FIG. 3 (e.g., bits #1). For example, the likelihood indicators can be a number of bit log-likelihood ratios (LLR) for each of the encoded bits. Other examples of the likelihood indicators include simple ratios and probability. It should be noted that any type of likelihood indications can suffice. The likelihood indicators from the decoder 440 can be used by the signal regenerators 450 to obtain an estimate of the signal transmitted from the transmit node 210.

In FIG. 4, the outputs of the signal regenerators 450 of the two chains represent estimates of the first and second signals $x_1$ and $x_2$. The interference canceller 470 can cancel the estimated signals from the total received signal, and the cleaned-up version of the received signal can be used in a subsequent stage of signal detection. In one aspect, interference canceller 470 reads the contents of the antenna buffer 410, cancels the interference, and writes the result back to the antenna buffer 410.

At any stage of interference cancellation, the interference canceller 470 can cancel interferences from other detected signals, e.g., interferences of signals $x_1$ and $x_2$ from each other. Own signal interferences such as ISI can also be cancelled. However, different interfering signals can have different levels of cancellation. The level of cancellation depends on the likelihood indicators such as the LLRs. If the LLRs have a high magnitude, indicating strong confidence, the level of cancellation is high. For example, the decoding of $x_1$ could result in a much stronger confidence (e.g., due to lower coding rate, higher received power, etc.) than that of $x_2$.

Figure 5:
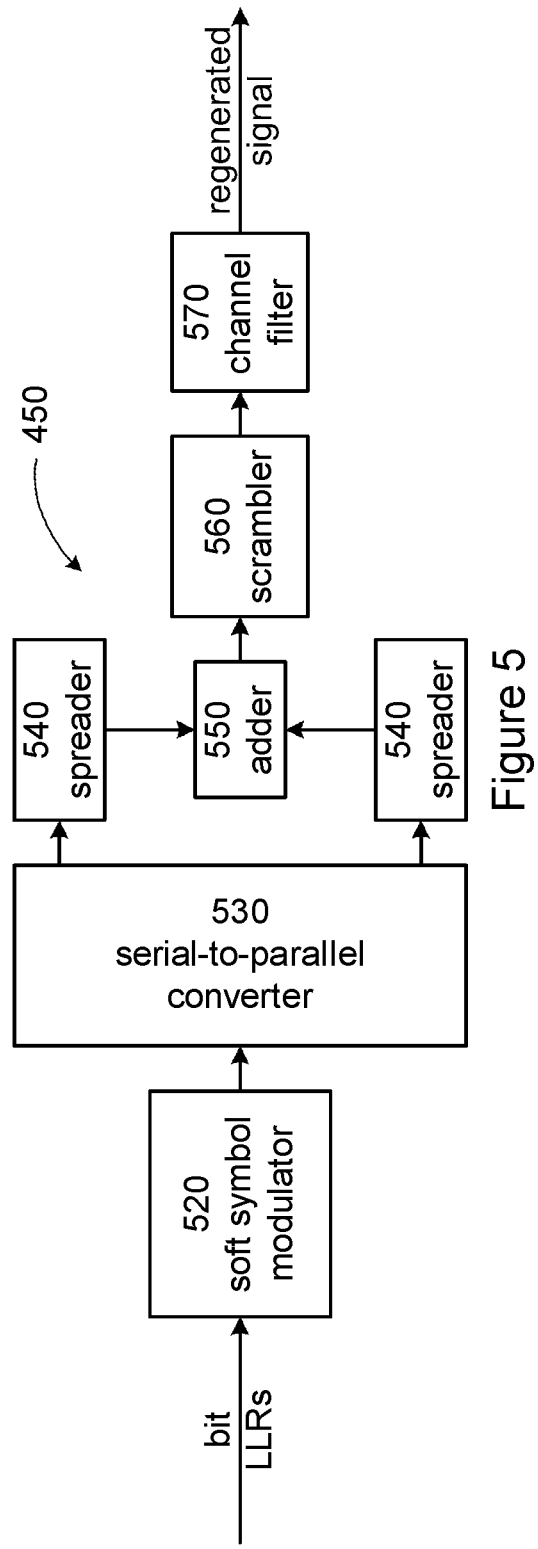
FIG. 5 illustrates an example embodiment of a signal regenerator.
Figure 6:
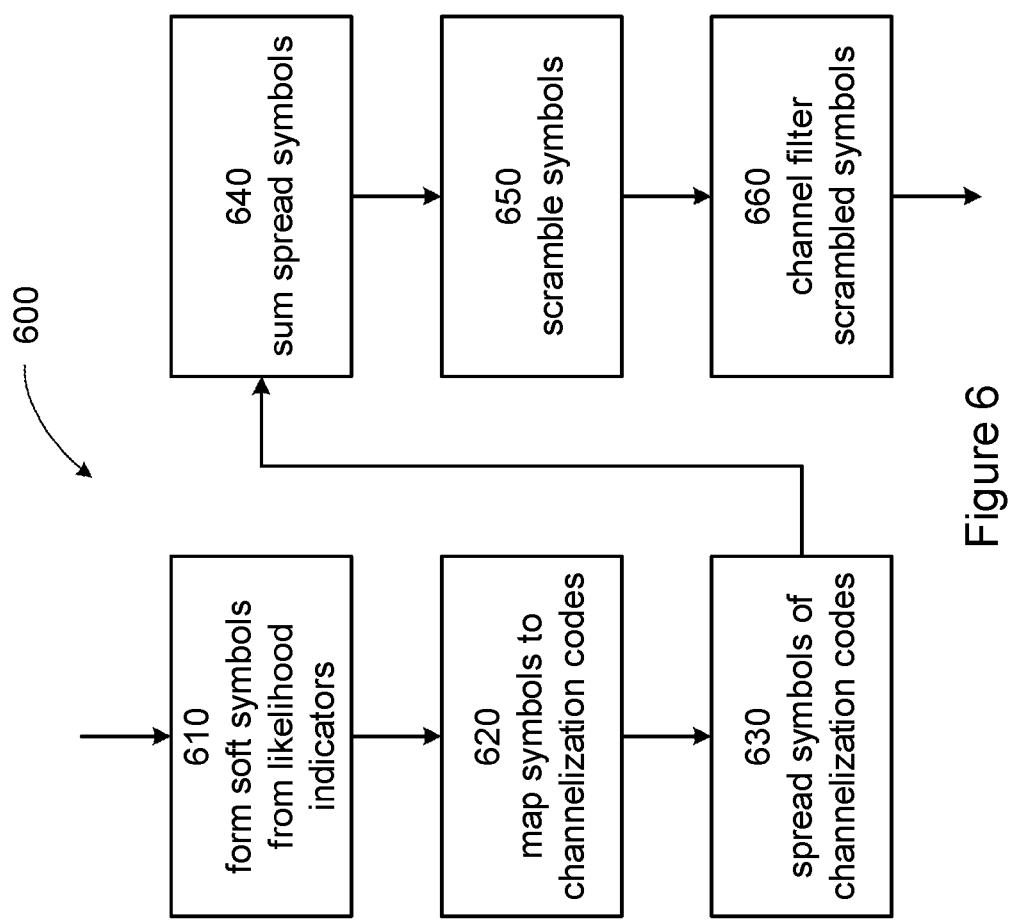
FIG. 6 illustrates a flow chart of an example process to regenerate an estimated signal.

An example architecture of the signal regenerator 450 is illustrated in FIG. 5 and a flow chart of an example process for signal regeneration is illustrated in FIG. 6. The signal regenerator 450 comprises a soft symbol modulator 520, a serial-to-parallel converter 530, one or more spreaders 540, an adder 550, a scrambler 560, and a channel filter 570. For each symbol of interest, the soft symbol modulator 520 in step 610 can form a soft symbol based on the likelihood indicators (e.g., LLRs) output by the decoder 440. The soft symbol can represent an estimate of the symbol of interest. The soft symbol can also represent an estimate of an interfering symbol. In one aspect, the soft symbol modulator 520 formulates each soft symbol as a conditional mean based on the likelihood indicators (e.g., the bit LLRs) output by the decoder 440.

The serial-to-parallel converter 530 can map the soft symbol into the channelization codes in step 620. Again, the number of channelization codes can be one or greater than one. The soft symbol can be spread by spreaders 640 on each of the channelization codes in step 630, and the spread signals can be summed together by an adder 550 in step 640, scrambled by the scrambler 560 in step 650, and channel-filtered by the channel filter 570 in step 660 to produce an estimate of the transmitted signal, e.g., an estimate of the signal $x_1$ or $x_2$. Of course, it is recognized that where there is only one channelization code, steps 620 and 640 need not be performed.

Note that the architecture of the signal regenerator 450 illustrated in FIG. 5 is similar to the transmit node model illustrated in FIG. 3. This is logical since it is preferable to generate the estimate of the signal in a way same or similar to the way in which the originally transmitted signal is generated. In one aspect, the correspondence between FIGS. 3 and 5 can be described as follows. The soft symbol modulator 520 generates a stream of soft symbols that are estimates of the corresponding stream of symbols generated by the modulator 320. The soft symbols are used to regenerate an estimation of the signal of interest. From the perspective of each symbol of interest, the soft symbol modulator 520 generates an estimate of that symbol of interest and generates estimates of interfering symbols in the same symbol stream. Estimates of interfering symbols in different symbol streams are also generated.

The turbo-IC receiver architecture of FIG. 4 is advantageous as the same regenerated signal can be used for other-signal cancellation as well as own ISI cancellation. However, this approach can result in an over-cancellation, where part of the desired signal is also cancelled (the non-ISI portion of the signal). The over-cancellation can be corrected through a signal add-back process performed by the equalizer 420.

Figure 7:
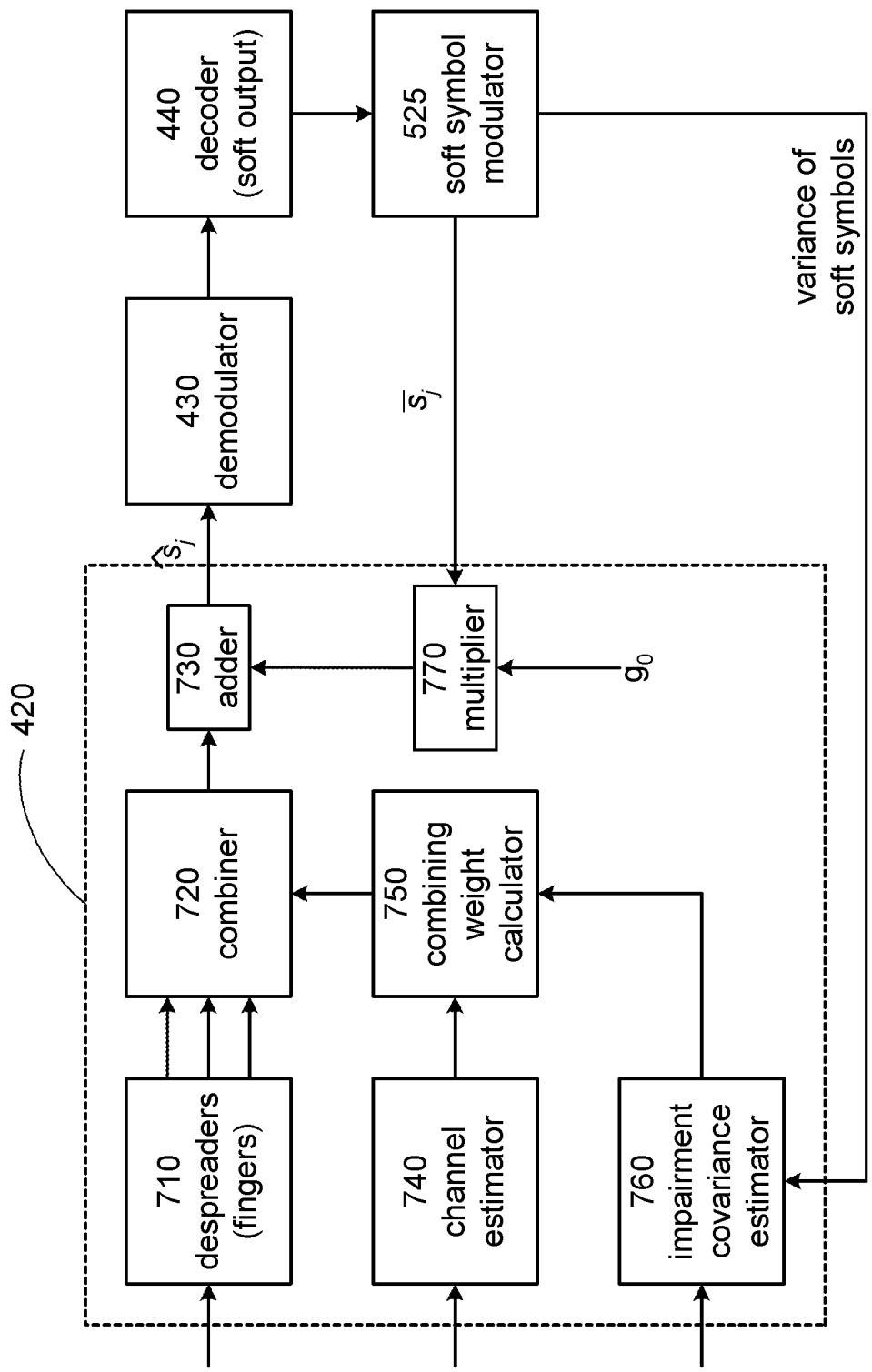
FIG. 7 illustrates an example embodiment of an equalizer adapted to perform a signal add-back process.

An example architecture of the equalizer 420 that can perform the signal add-back process is illustrated in FIG. 7. In this figure, a G-Rake+ equalizer is adapted to perform the signal add-back process, which can be performed during the G-Rake+ equalization. As shown, the soft symbol $\bar{s}$ is added back to form a fully equalized symbol $\hat{s}$. An example of soft ISI cancellation using the decoder output LLRs is described in U.S. Patent Publication 2007/0147481 incorporated by reference in its entirety herein.

Figure 8:
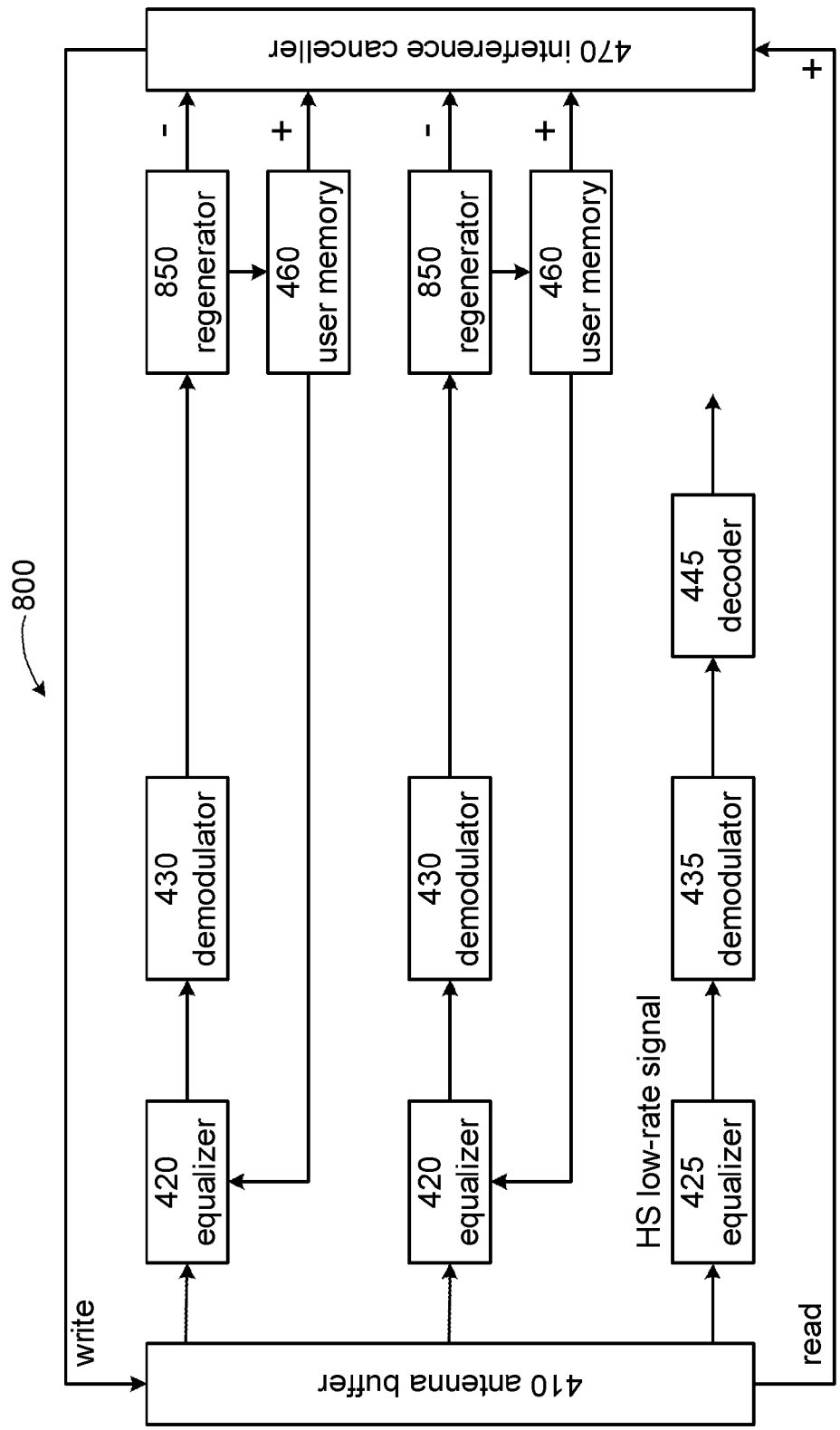
FIG. 8 illustrates a second example embodiment of an iterative receiver.

A high-level architecture of another example turbo-IC receiver capable of recovering the information bits from the first and second signals is shown in FIG. 8. Note that the receiver 800 comprises components similar or identical to that of the receiver 400 such as the antenna buffer 410, equalizers 420, demodulators 430, user memories 460 and the interference canceller 470. The receiver 800 can perform iterative hard and/or soft pre-decoding interference cancellation based on the output of the demodulator 430. Thus, the decoder 440 need not be included in the receiver 800 for pre-decoding cancellation.

Figure 9:
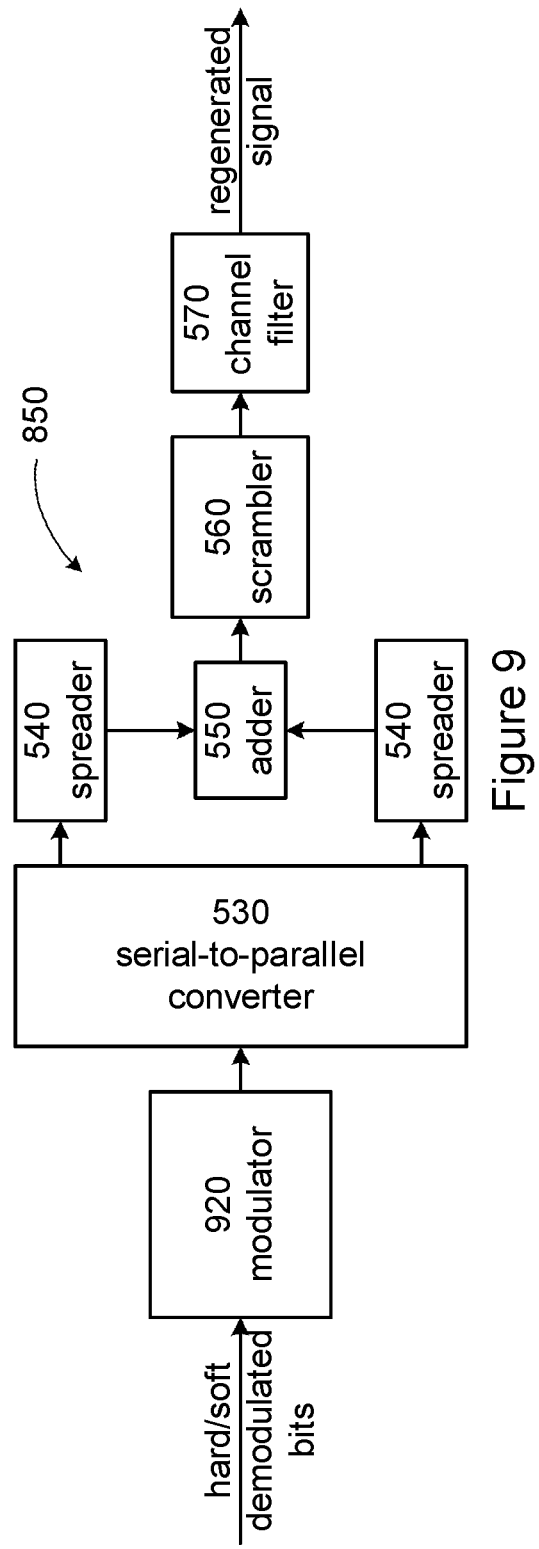
FIG. 9 illustrates second example embodiment of a signal regenerator.

An example architecture of the signal regenerator 850 is illustrated in FIG. 9. As seen, the signal regenerator 850 includes components to that of the signal regenerator 450 illustrated in FIG. 5. Thus, the detailed descriptions with regard to the similar components are not repeated. The signal regenerator 450 and 850 differ in that the regenerator 850 includes a modulator 920 structured to output a symbol based on the demodulated bits output (in the case of hard pre-decoding interference cancellation) or bit LLRs (in the case of soft pre-decoding interference cancellation) from the demodulator 430. From the perspective of each symbol of interest, the modulator 920 generates an estimate (hard or soft) of that symbol of interest and estimates of interfering symbols in the same symbol stream. Estimates of interfering symbols in different symbol streams are generated by different modulators 920.

Figure 10:
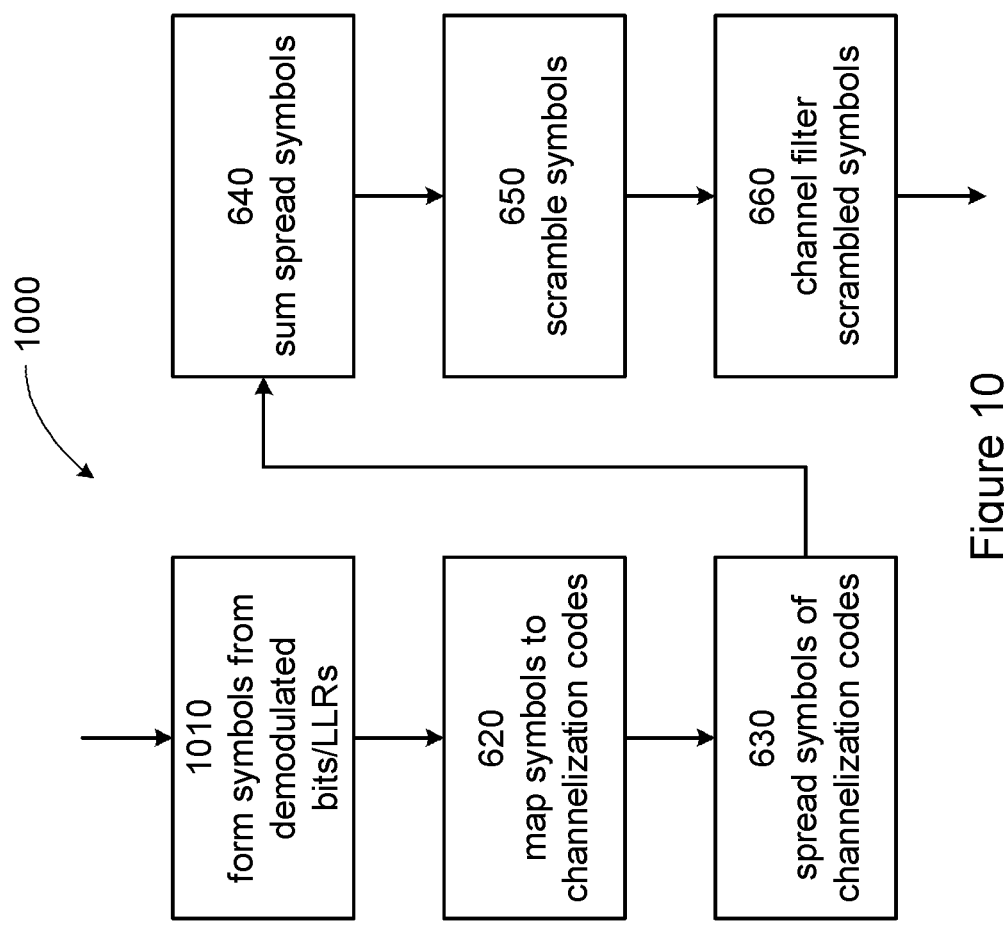
FIG. 10 illustrates a flow chart of a second example process to regenerate an estimated signal.

A flow chart of an example process for signal regeneration performed by the signal regenerator 850 is illustrated in FIG. 10. In FIG. 10, the modulator 920 in step 1010 can form the symbol estimate based on the demodulated bits or bit LLRs output by the demodulator 430. The remaining steps are similar to the steps in FIG. 6, and therefore, the detailed description of the steps is not repeated. Again, when there is only one channelization code, steps 620 and 640 need not be performed.

Figure 11:
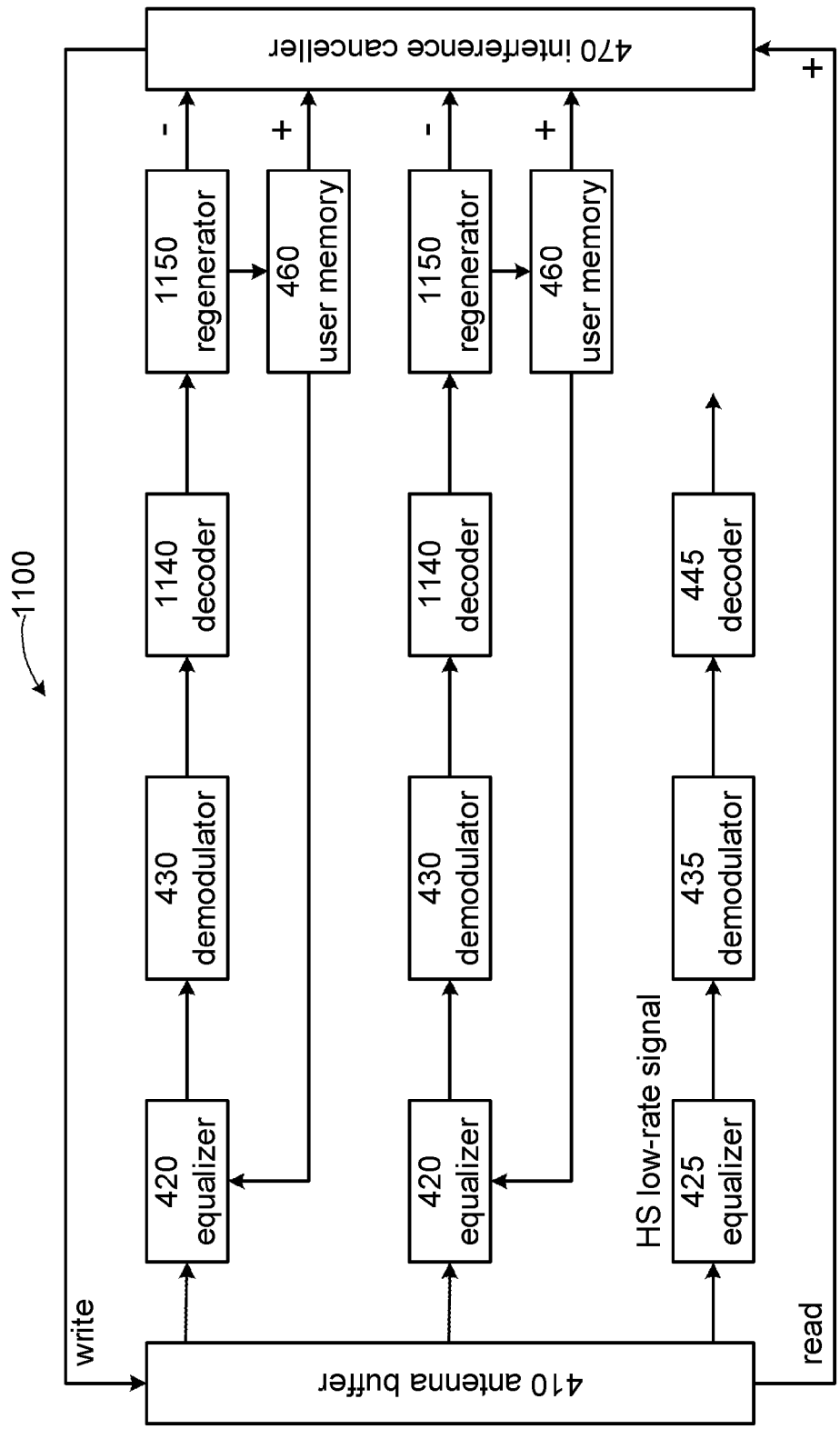
FIG. 11 illustrates a third example embodiment of an iterative receiver.
Figure 12:
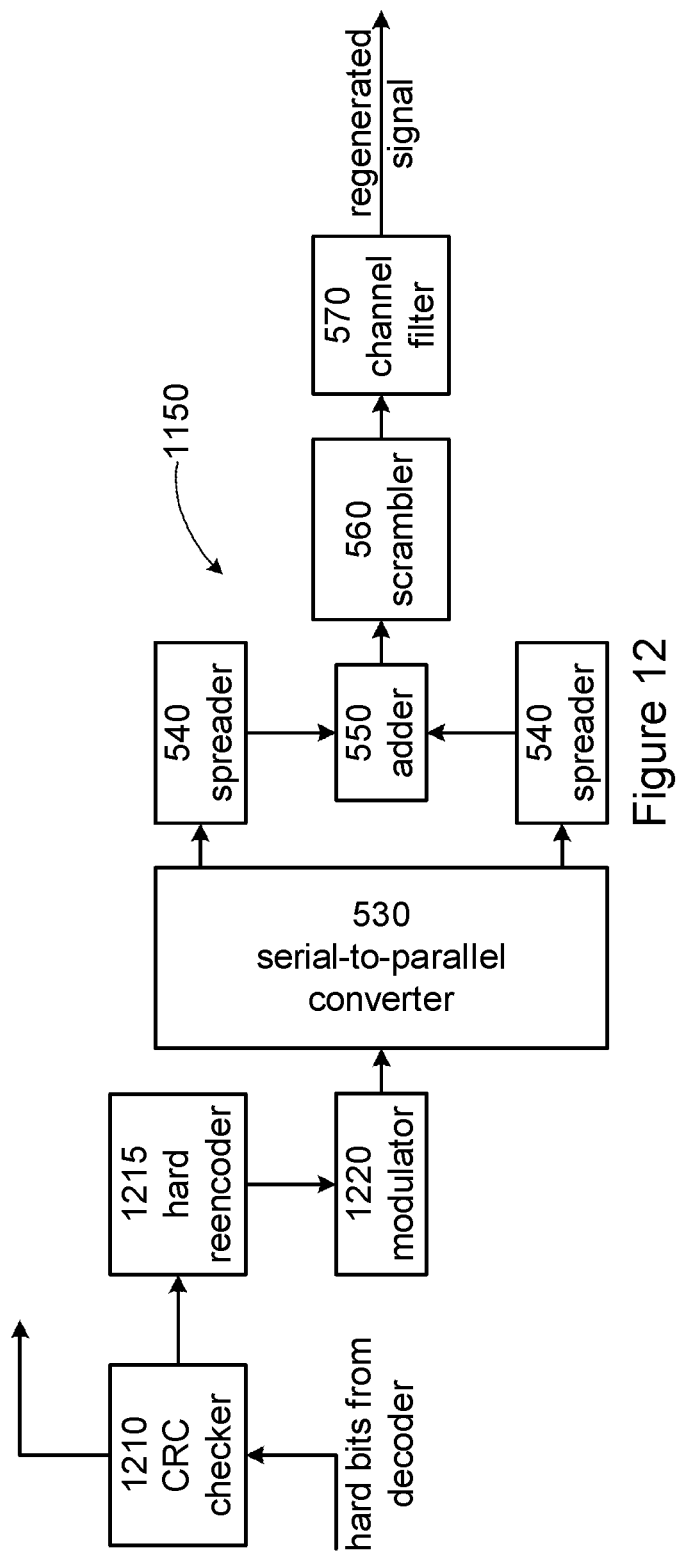
FIG. 12 illustrates third example embodiment of a signal regenerator.

A high-level architecture of yet another example turbo-IC receiver capable of recovering the information bits from the first and second signals is shown in FIG. 11. In the receiver 1100, the decoder 1140 outputs hard information bits instead of encoded bit likelihood indicators, and signal regenerator 1150 regenerates the signal based on the hard information bits. A high-level architecture of signal regenerator 1150 is shown in FIG. 12. Again, detailed descriptions of similar components will not be repeated.

For iterative hard post-decoding multi-layer or multi-user interference cancellation, the regeneration of the signal can be based on hard information bits of the decoder 1140 output when the cyclic redundancy check (CRC) passes. As seen in FIG. 12, the signal regenerator 1150 includes a CRC checker 1210 structured to check the CRC of the output of the decoder 1140, a hard reencoder 1215 structured to encode the output of the decoder 1140 to generate reencoded bits, and a modulator 1220 structured to output a symbol based on the reencoded bits from the reencoder 1215. When the CRC passes, the hard information bits from the decoder 1140 are reencoded by the hard reencoder 1215 and provided to the modulator 1220 (arrow from the CRC checker 1210 to the hard reencoder 1215 to the modulator 1220) for signal regeneration. When the CRC does not pass, the estimated signal is neither regenerated nor cancelled (the arrow exiting from top of the CRC checker 1210).

Figure 13:
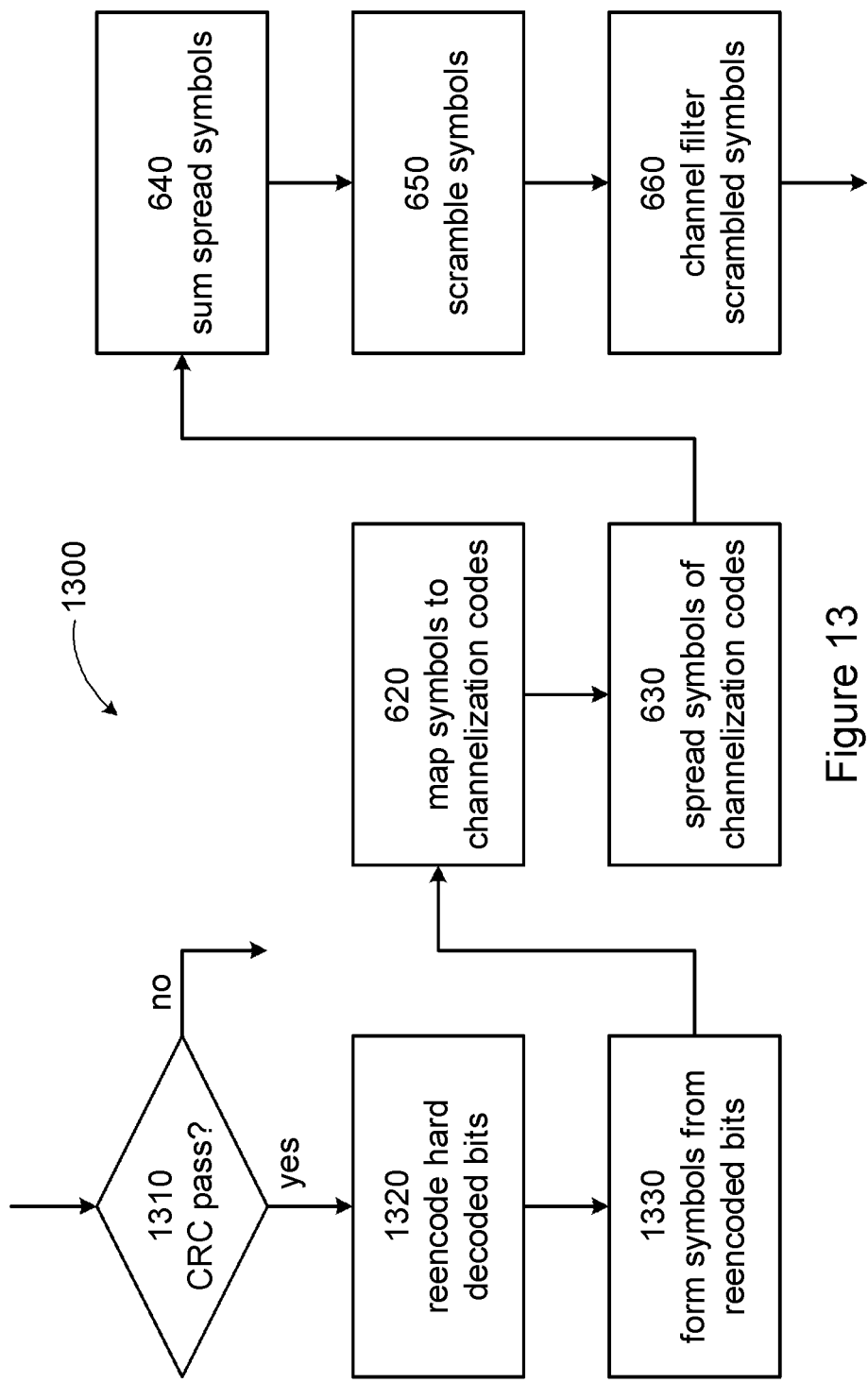
FIG. 13 illustrates a flow chart of a third example process to regenerate an estimated signal.

A flow chart of an example process for signal regeneration generation performed by the signal regenerator 1150 is illustrated in FIG. 13. As seen, in the CRC checker 1210 can determine whether the CRC passes in step 1310. If the CRC passes, then in step 1320, the reencoder 1215 reencodes the decoded hard information bits from the decoder 1140, and in step 1330, the modulator 1220 can form the symbol estimate based on the reencoded bits. If the CRC does not pass, interference cancellation is not performed. The remaining steps are similar to the steps of FIGS. 6 and 10.

Figure 14:
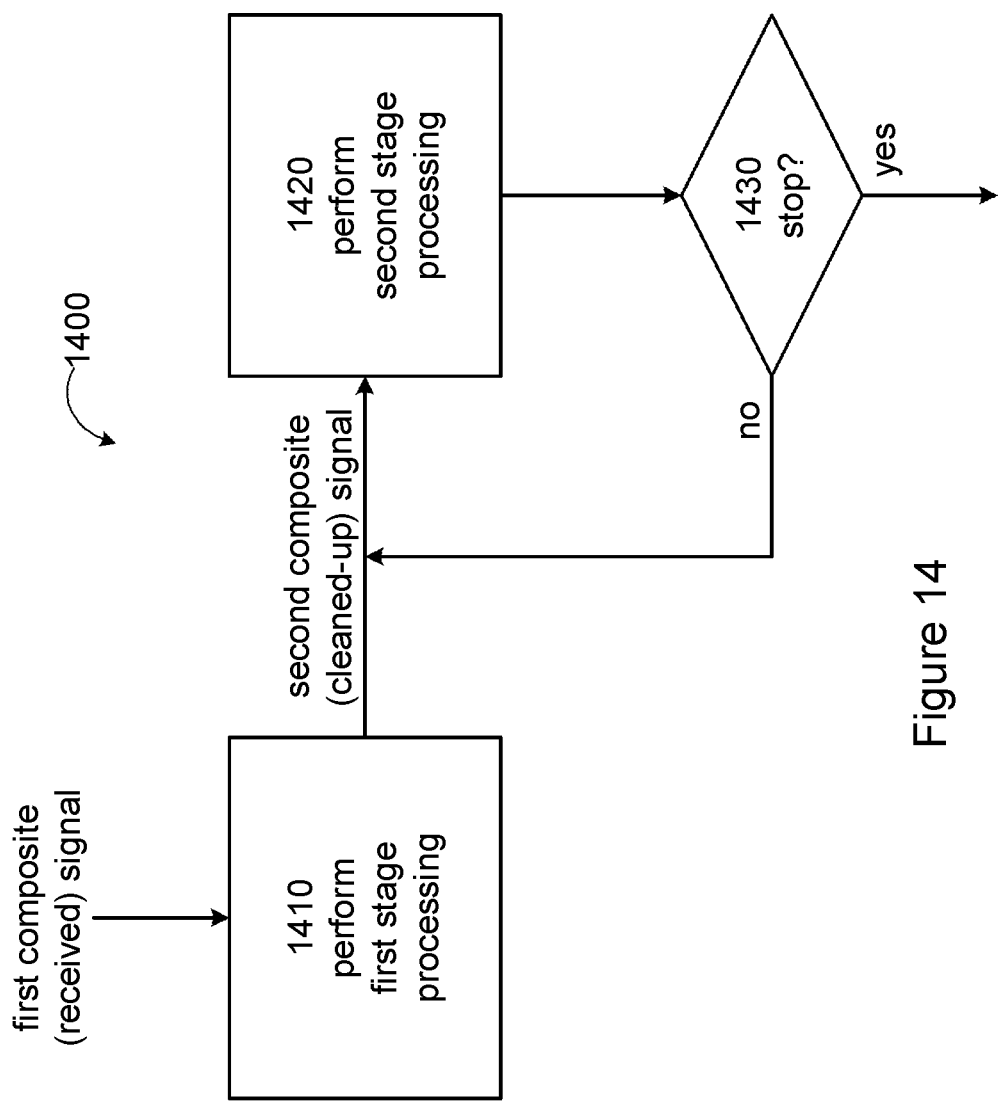
FIG. 14 illustrates a flow chart of an example method for adaptive finger placement.

As mentioned previously, in an iterative multi-stage interference-cancellation, the interference characteristics can change as a portion of the interference is cancelled. In one aspect of the disclosed subject matter, the finger placement strategy is adapted according to the new interference characteristics after interference cancellation. An example method for adaptive finger placement is illustrated in FIG. 14. The method 1400 can be performed in the receive node 230 of a communication network 100 to process a symbol of interest carried in a received signal. For example, the symbol of interest can be a symbol carried in the first signal $x_1$.

Broadly, in the method 1400, the receive node 230 can perform a first stage processing on the symbol of interest contained in a first composite signal in step 1410. Subsequently, the receive node 230 can perform a second stage processing 1420 on the same symbol of interest contained in a second composite signal in step 1420. The first composite signal may be assumed to be the received signal r. After the first stage processing 1410, at least a portion of the interferences can be canceled which generates a cleaned-up signal which can be viewed as an interference-reduced version of the first composite signal.

As a result of interference cancellation in the first stage processing 1410, the interference characteristics of the cleaned-up signal can be different from the original received signal. Thus, in the second stage processing 1420, finger placements are adapted accordingly and the interference can be further canceled. This could result in a further cleaned-up signal. The further cleaned-up signal is also an interference-reduced version of the first composite signal.

In step 1430, the receive node 230 determines whether the processing of the symbol of interest can stop. This can be determined in a variety of ways such as reaching a predetermined level of interference cancellation, reaching a predetermined number of iterations of the second stage processing 1420, reaching a CRC check, reaching a predetermined level QoS parameters such as of SINR, BER, FER, and so on. If further processing is needed (no branch from 1430), the second stage processing 1420 is performed again.

Note that each second stage processing 1420 can change the interference characteristics. Thus, through each iteration of the second stage processing 1420, the finger placements can be readapted based on the changed interference characteristics, i.e., based on the interference characteristics of the second composite signal inputted to the second stage processing 1420. More broadly, processing delays can be determined as the interference characteristics change, and the despreading and combining of the signal can be performed based on the processing delays.

A more detailed example implementation of the method 1400 to adapt the finger placements is described as follows. In this implementation, it is assumed that the equalizer 420 is a G-Rake or a G-Rake+ equalizer. Regarding G-Rake finger placements, a mirror image based strategy can be used. Let L(i) be the number of resolvable paths corresponding to signal i's propagation channel, and $g_i(l)$ and $\tau_i(l)$ are the complex channel coefficient and the delay corresponding to the lth path, respectively. A mirror image based finger placement strategy can place fingers on the strongest multipaths among $\tau_i(l)$ first. These are referred to as energy-collecting fingers.

In addition, a number of interference-suppressing fingers can be used. The delays of these interference-suppressing fingers can be determined based on the differential delays between the strongest multipath components. For example, assume that the average power of the L(i) paths is in descending order of l; thus $\tau_i(0)$ and $\tau_i(1)$ are the delays of the strongest two paths. The difference in delay between $\tau_i(0)$ and $\tau_i(1)$, $$\Delta_i = \tau_i(1) - \tau_i(0), \quad (4)$$

can be used to determine the delays of interference-suppressing fingers. For example, these interference-suppressing fingers may have delays $(\tau_i(0)-\Delta_i, \tau_i(0)+\Delta_i, \tau_i(0)-2\Delta_i, \tau_i(0)+2\Delta_i, \ldots)$.

In this example, these interference-suppressing fingers are anchored on energy-collecting finger $\tau_i(0)$. Additional interference-suppressing fingers anchored on another energy-collecting finger may be used as well, $(\tau_i(1)-\Delta_i, \tau_i(1)+\Delta_i, \tau_i(1)-2\Delta_i, \tau_i(1)+2\Delta_i, \ldots)$. Differential delays corresponding to other delay difference can be used instead of, or in addition to, the above finger delays, in a similar fashion. For example, $\Delta_i$ corresponding to $\tau_i(2)-\tau_i(0)$ or $\tau_i(2)-\tau_i(1)$ might be used. When self-interference dominates (e.g., self-interference of the $i^{th}$ signal $x_i$), such finger placement strategy can be effective.

Prior to the first stage processing 1410 being performed, no interference cancellation has been done for the symbol of interest. For the first signal $x_1$ in the first stage processing 1410, let $C_1$ be the impairment covariance matrix obtained for the G-Rake+ equalizer 420 equalizing the first signal $x_1$ (e.g., the top equalizer 420 in FIG. 4). It can be shown that $$C_1 = E(1)C_{I,1}(1) + E(2)C_{I,1}(2) + R_{N,1}, \quad (5)$$

where E(i) is the total symbol energy for signal i, $C_{I,1}(i)$ is the impairment covariance matrix contributed by signal i, and $R_{N,1}$ accounts for contribution by signals that are not included in turbo-IC cancellation, plus noise. Note that from the perspective of the first signal $x_1$, $C_{I,1}(1)$ is due to self interference, whereas $C_{I,1}(2)$ is due to other-signal interference (e.g., due to the second signal $x_2$).

As mentioned earlier, the soft symbol modulator 520 (See FIG. 5) can use the likelihood indicators (e.g., the bit LLRs) output from the decoder 440 to compute the conditional mean (soft symbol) for a symbol of interest. A detailed description can be found in U.S. Patent Publication 2011/0222618 which is herein incorporated it its entirety by reference. The level of interference cancellation depends on the variance of a regenerated soft symbol. The variance of the symbol $s_j(k, i)$ for signal #j on the kth channelization code during the ith symbol interval can be obtained by $$\sigma_{s,j}^2(k,i) = E[|s_j(k,i)|^2 | I_j(k,i)] - |E[s_j(k,i)|I_j(k,i)]|^2, \quad (6)$$

where $I_j(k,i)$ are the soft outputs from the decoder 440 which indicate the LLRs of a number of encoded bits used to determine the symbol $s_j(k,i)$. The equation of (6) can also be referred to as the variance of the symbol $s_j(k,i)$. The variance can be further averaged over all the symbols (over k and i), $$\sigma_{s,j}^2 = \frac{1}{KI} \sum_{k=0}^{K-1} \sum_{i=0}^{I-1} \sigma_{s,j}^2(k, i). \quad (7)$$

It can be shown that the impairment covariance matrix after interference cancellation becomes $$\tilde{C}_1 = E(1)\sigma_{s,1}^2 C_{I,1}(1) + E(2)\sigma_{s,2}^2 C_{I,1}(2) + R_{N,1}. \quad (8)$$

Thus, if the soft symbol modulator 520 generates the soft symbols with complete certainty, then the variance $\sigma_{s,j}^2 = 0$, and in this case the contribution of signal j to the impairment covariance matrix is 0. One of the cases is a scheme with hard post-decoding IC (e.g., when the CRC checks) as illustrated in FIGS. 11, 12 and 13.

The variance can be approximated by the residual interference power after cancellation. In this instance, the conditional mean $\bar{s}_j(k,i) = E[s_j(k,i)|I_j(,i)]|$, which is output by the soft symbol modulator 520, can be used as estimated interfering symbol for cancellation. Thus, on average, the amount of interference power that is cancelled is $$P_{IC}(j) = \frac{1}{KI} \sum_{k=0}^{K-1} \sum_{i=0}^{I-1} |\bar{s}_j(k,i)|^2.$$

The residual power from signal j is thus $E(j)(1-P_{IC}(j))$. In this case, the impairment covariance matrix after interference cancellation becomes $$\tilde{C}_1 = E(1)(1-P_{IC}(1))C_{I,1}(1) + E(2)(1-P_{IC}(2))C_{I,1}(2) + R_{N,1}. \quad (9)$$

In the second stage processing 1420, when the first signal $x_1$ is equalized again using the G-Rake+ equalizer 420, the residual interference powers $E(1)(1-P_{IC}(1))$ and $E(2)(1-P_{IC}(2))$ can be used to determine the finger placement strategy.

Thus far, effects due to control channels and possible other low-rate channels from the same user (or antenna) have been ignored. In some setups, these channels are not included in turbo-IC. To account for this, let $\alpha$ be the fraction of power allocated to the channels that are not cancelled using turbo-IC, and thus $1-\alpha$ to the channels that are included in turbo-IC. In this case, the impairment covariance matrix after interference cancellation becomes $$\tilde{C}_1 = E(1)(\alpha(1) + (1-\alpha(1))\sigma_{\bar{s},1}^2)C_{I,1}(1) + E(2)(\alpha(2) + (1-\alpha(2))\sigma_{\bar{s},2}^2)C_{I,1}(2) + R_{N,1} \quad (10)$$

Note that when $\alpha=0$, equations (9) and (10) become identical. Regardless, the residual interference power level can be estimated by $$\epsilon(i) = E(i)(\alpha(i) + (1-\alpha(i))\sigma_{\bar{s},i}^2). \quad (11)$$

In the second turbo-IC iteration, when the signal $x_1$ is equalized again, the residual interference power levels $\epsilon(1)$ and $\epsilon(2)$ can be used to determine the finger placement strategy. For example, if the decoding of the signal $x_1$ is error free and bit LLRs are very high, then $\sigma_{\bar{s},1}^2=0$, and thus $\epsilon(1)$ is small. On the other hand, if we assume the signal $x_2$ decoding yields small LLR magnitudes, then $\sigma_{\bar{s},2}^2 \approx 1$, and thus $\epsilon(2)$ is high. In this case, the finger placement strategy of the G-Rake+ equalizer 420 for the signal $x_1$ will also be determined by the delays of second signal $x_2$ propagation channel. Specifically, the interference-suppressing fingers may have delays $(\tau_1(0)-\Delta_2, \tau_1(0)+\Delta_2, \tau_1(0)-2\Delta_2, \tau_1(0)+2\Delta_2, \ldots)$.

Note that the differential delay $\Delta_2 = \tau_2(1) - \tau_2(0)$ is determined by the difference in delay between the strongest paths of the second signal $x_2$ channel. More interference-suppressing fingers may be used, e.g., $(\tau_1(1)-\Delta_2, \tau_1(1)+\Delta_2, \tau_1(1)-2\Delta_2, \tau_1(1)+2\Delta_2, \ldots)$.

In another embodiment, both signals $x_1$ and $x_2$ can be almost completely cancelled after the soft interference cancellation. Then, the interference-suppressing fingers of signal $x_1$ equalizer 420 can have delays determined by the multipath delays of another dominant signal which is not included in turbo-IC operation. On the other hand, if such a dominant interferer does not exist, then there is no need for having the interference-suppressing fingers. In this case, G-Rake+ equalizer 420 can become a conventional Rake equalizer, i.e., only energy-collecting fingers are needed. Thus, another aspect of the disclosure is that even the type of equalization (Rake versus G-Rake+) and the number of fingers may be adapted according to the residual interference characteristics.

Figure 15:
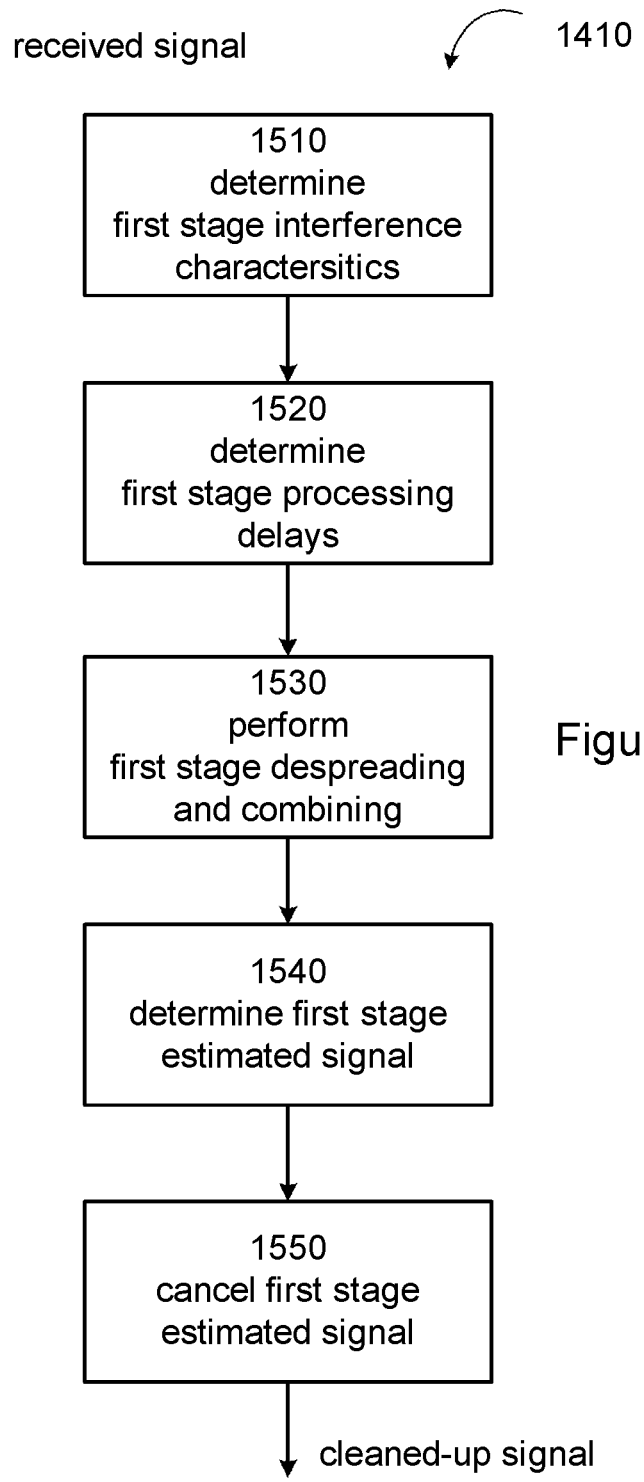
FIG. 15 illustrates a flow chart of an example process to implement a first stage processing of the method for adaptive finger placement.

FIG. 15 illustrates a flow chart of an example process performed by the receiver 400, 800, 1100 to implement the first stage processing 1410 for the symbol of interest contained in the first composite signal. As seen, the equalizer 420 determines in step 1510 one or more first stage interference characteristics based on the first composite signal. The first stage interference can be characterized by the first composite signal's correlation function or by interference power levels.

Figure 16:
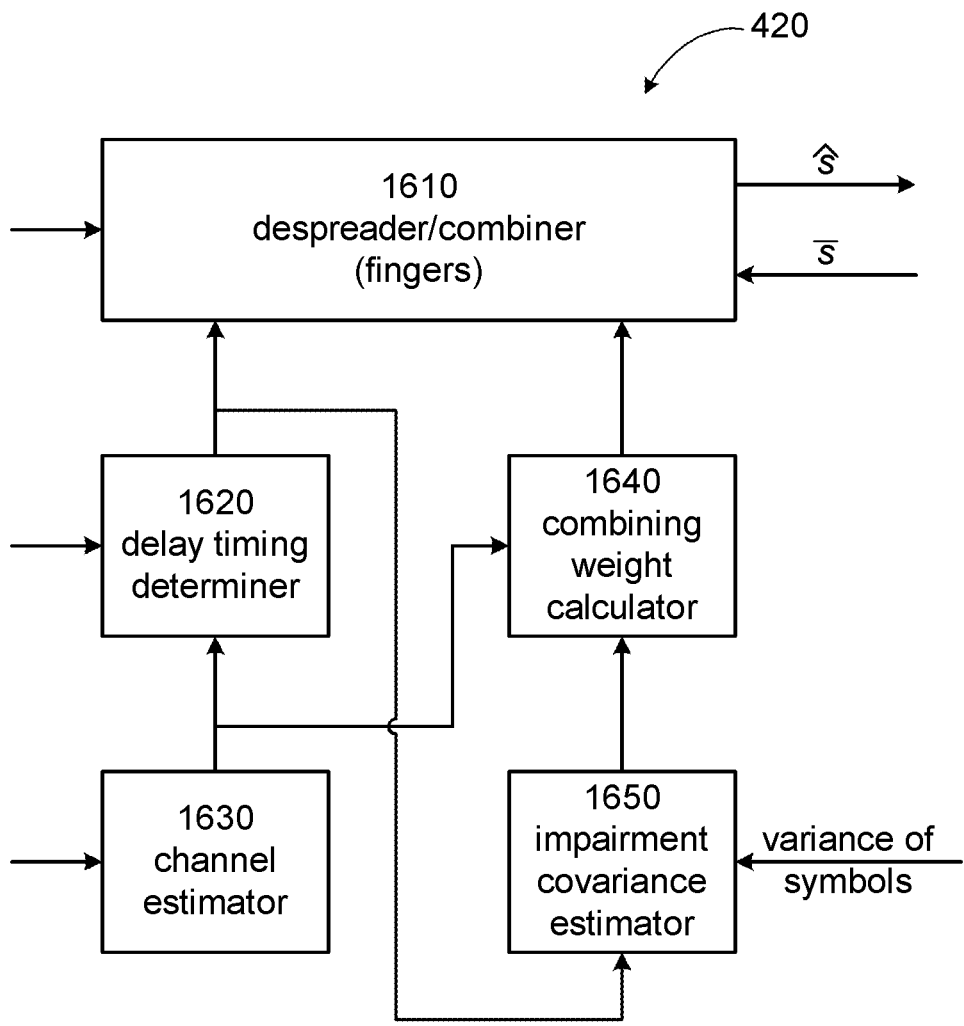
FIG. 16 illustrates an example embodiment of a G-Rake equalizer.

FIG. 16 illustrates an example architecture of a G-Rake+ equalizer 420. As seen, the equalizer 420 includes a despreader/combiner 1610 that includes a plurality of fingers. The despreader/combiner 1610 is structured to output despread and combined value for the symbol of interest. A delay timing determiner 1620 is structured to determine the delays (finger placements) for each despread value corresponding, and a combining weight calculator 1640 is structured to calculate the weight of each despread value. A channel estimator 1630 is structured to estimate the channel and the impairment covariance estimator 1650 is structured to estimate the impairment covariance of the first composite signal.

Referring back to FIG. 15, the delay timing determiner 1620 can determine one or more first stage processing delays based on the first stage interference characteristics in step 1520. In other words, the placements of the fingers can be determined by the delay timing determiner 1620.

Figure 17A:
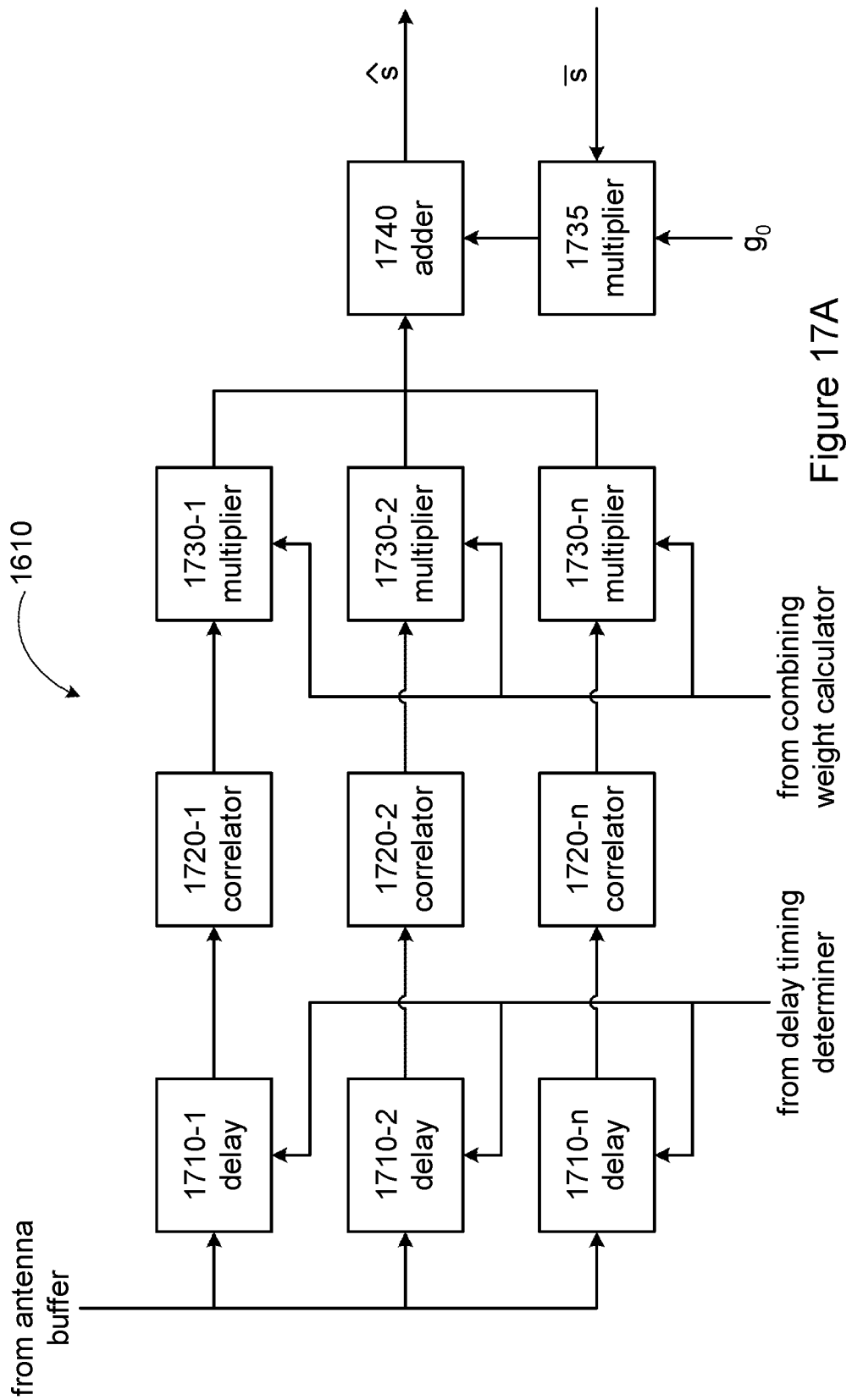
FIGS. 17A and 17B illustrate example embodiments of a despreader/combiner of the G-Rake equalizer.
Figure 17B:
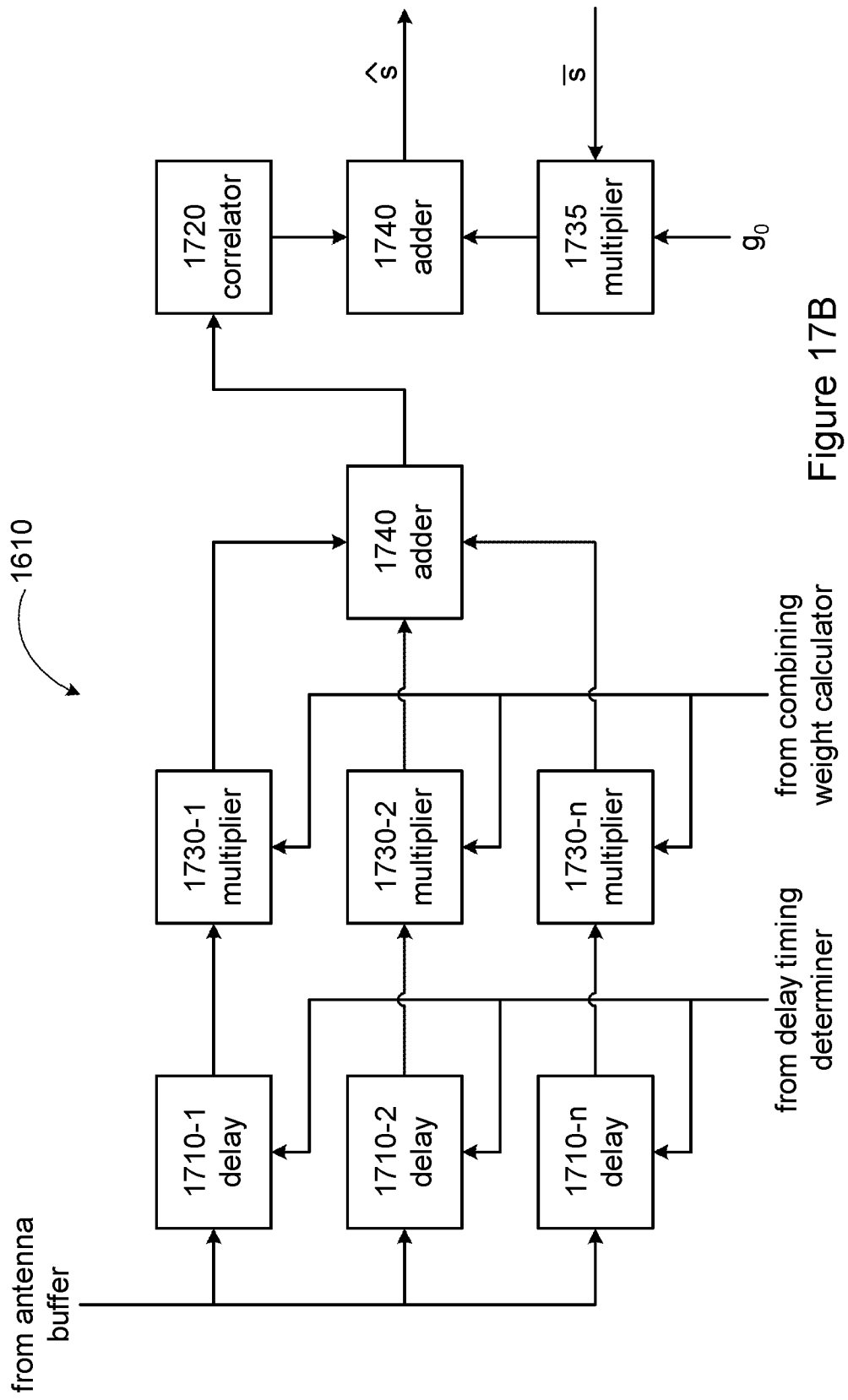

Based on the processing delays, the equalizer 420 can perform a first stage despreading and combining of the first composite signal based on the first stage processing delays to generate a first stage equalized signal in step 1530. More specifically, the despreader/combiner 1610 can perform the step 1530. FIGS. 17A and 17B are example embodiments of the despreader/combiner 1610. As seen, both embodiments of the despreader/combiner 1610 can comprise a plurality of delays (fingers) 1710, one or more correlators 1720, a plurality of multipliers 1730, and one or more adders 1740. The embodiments can also include another multiplier 1735 for performing desired signal add-back processing described earlier. The difference between the embodiments is illustrated in corresponding flow charts of FIGS. 18A and 18B.

As illustrated in FIG. 18A, the despreader/combiner 1610 of FIG. 17A despreads the first composite signal in step 1810 based on the first stage processing delays. Then in step 1820, the despread values are combined based on the first combining weights provided by the combining weight calculator 1640, and a first stage equalized signal is output. But as illustrated in FIG. 18B, the despreader/combiner 1610 of FIG. 17B combines the first composite signal based on the first stage processing delays and the first combining weights in step 1815. Then in step 1825, the combined values are despread to output the first stage equalized signal. For both FIGS. 18A and 18B, the first combining weights can be combining weights of energy-collecting fingers only or for both energy-collecting and interference-suppression fingers.

Figures 19A, 19B, 19C:
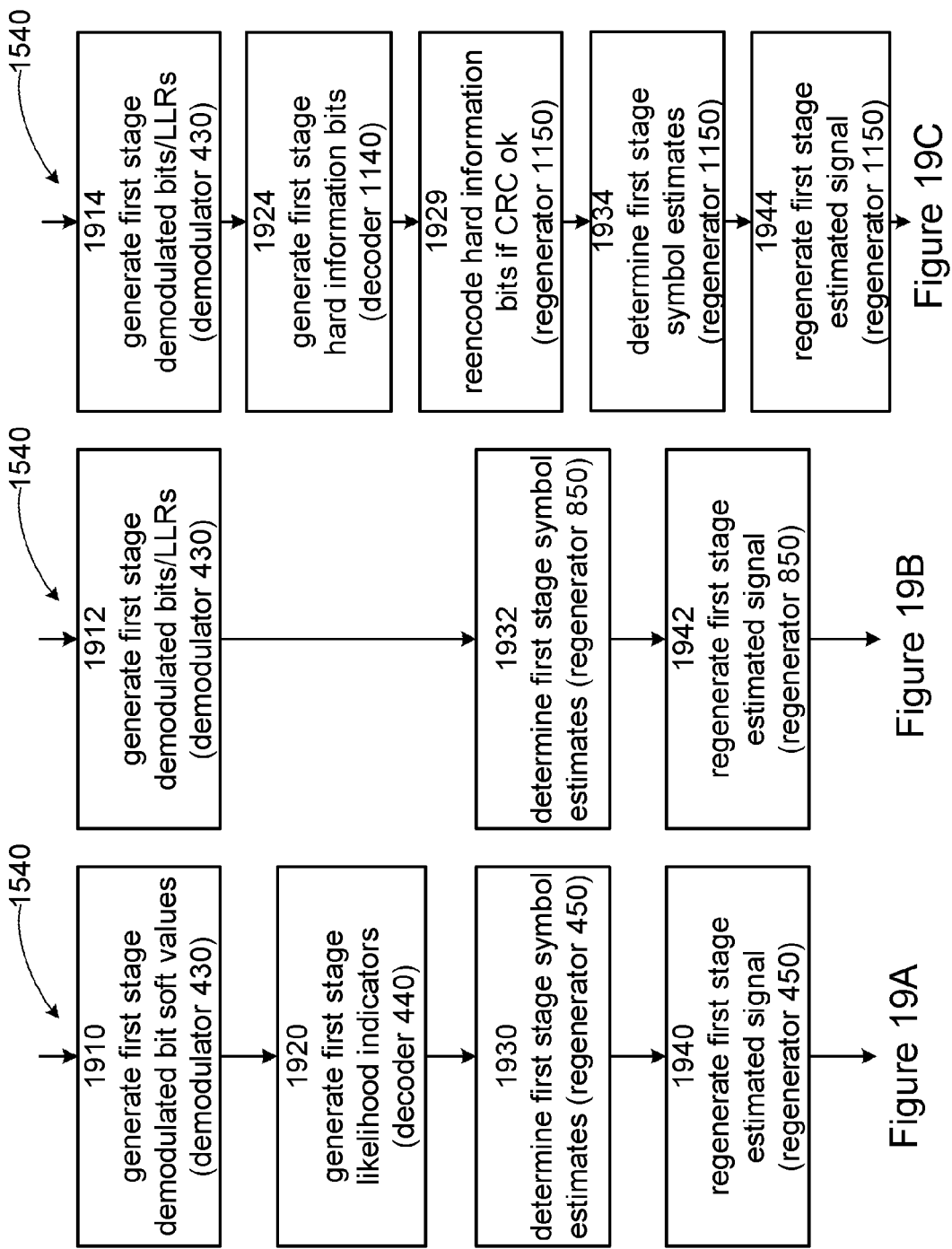
FIGS. 19A, 19B and 19C illustrate flow charts of example processes to estimate signals in a first stage.

Referring back to FIG. 15, after the first stage despreading and combining step 1530 is performed, the receiver 400, 800, 1100 estimates the signal of interest, i.e., determines the first stage estimated signal, based on the first stage equalized signal in step 1540. In one aspect, the demodulator 430, the decoder 440 and the signal regenerator 450 can perform this step as illustrated in FIG. 19A. In this aspect, the signal regeneration is performed based on soft outputs of the decoder 440. In step 1910, the demodulator 430 demodulates the first stage equalized signal and generates first stage demodulated bits corresponding to the symbol of interest. In step 1920, the decoder 440 decodes the first stage demodulated bits to generate first stage likelihood indicators such as LLR, ratios, and so on. Then in step 1930, the signal regenerator 450 determines the first stage estimates of the symbols in the signal of interest based on the likelihood indicators, and in step 1940, regenerates the first stage estimated signal based on the first stage symbol estimates. Recall from the discussion above that each signal of interest $x_i$ includes therein a number of symbols. Note that the demodulation/estimation steps are repeated for all symbols carried by the signal $x_i$. In doing so, estimates of symbols for all symbols including the symbols of interest as well as estimates of interfering symbols are generated. Based on these first stage symbol estimates, the first stage estimated signal is determined. An example process to perform the steps 1930 and 1940 is illustrated in FIG. 6.

In another aspect, the demodulator 430 and the signal regenerator 850 can perform the step 1540 as illustrated in FIG. 19B. In this aspect, the pre-decoding signal regeneration is performed based on the hard or soft outputs of the demodulator 430. In step 1912, the demodulator 430 demodulates the first stage equalized signal and generates first stage demodulated bits or likelihood indicators corresponding to the symbol of interest. In step 1932, the signal regenerator 850 determines the first stage estimates of the symbols in the signals of interest based on the first stage demodulated bits or the likelihood indicators, and in step 1942, regenerates the estimated signal based on the first stage estimate. Again, the demodulation/estimation steps are repeated to determine the first stage symbol estimates (of the symbol of interest as well as interfering symbols), and the first stage estimated signal is determined based on these stage symbol estimates. An example process to perform the steps 1932 and 1942 is illustrated in FIG. 10.

In yet another aspect, the demodulator 430, the decoder 1140 and the signal regenerator 1150 can perform the step 1540 as illustrated in FIG. 19C. In this aspect, the signal regeneration is performed based on hard information bits of the decoder 1140. In step 1914, the demodulator 430 demodulates the first stage equalized signal and generates first stage demodulated bits or likelihood indicators corresponding to the symbol of interest. In step 1924, the decoder 1140 decodes the first stage demodulated bits or likelihood indicators to generate hard information bits. In step 1929, the signal regenerator 1150 reencodes the hard information bits if the CRC is ok. Then in step 1934, the signal regenerator 1150 determines the first stage symbol estimates based on the hard reencoded information, and in step 1944, regenerates the signal based on the first stage symbol estimates. An example process to perform the steps 1929, 1934 and 1944 is illustrated in FIG. 13.

Again referring back to FIG. 15, the interference canceller 470 cancels the first stage estimated signal from the first composite signal to generate the interference-reduced version of the first composite signal in step 1550.

After the first stage processing 1410, the second stage processing 1420 is performed to process the symbol of interest contained in the second composite signal. The second composite signal can be the interference-reduced version of the first composite signal. But recall that the second stage processing 1420 can be performed more than once. Thus the second composite signal can be an interference-reduced version of the second composite signal in a previous run of the second stage processing 1420.

Figure 20:
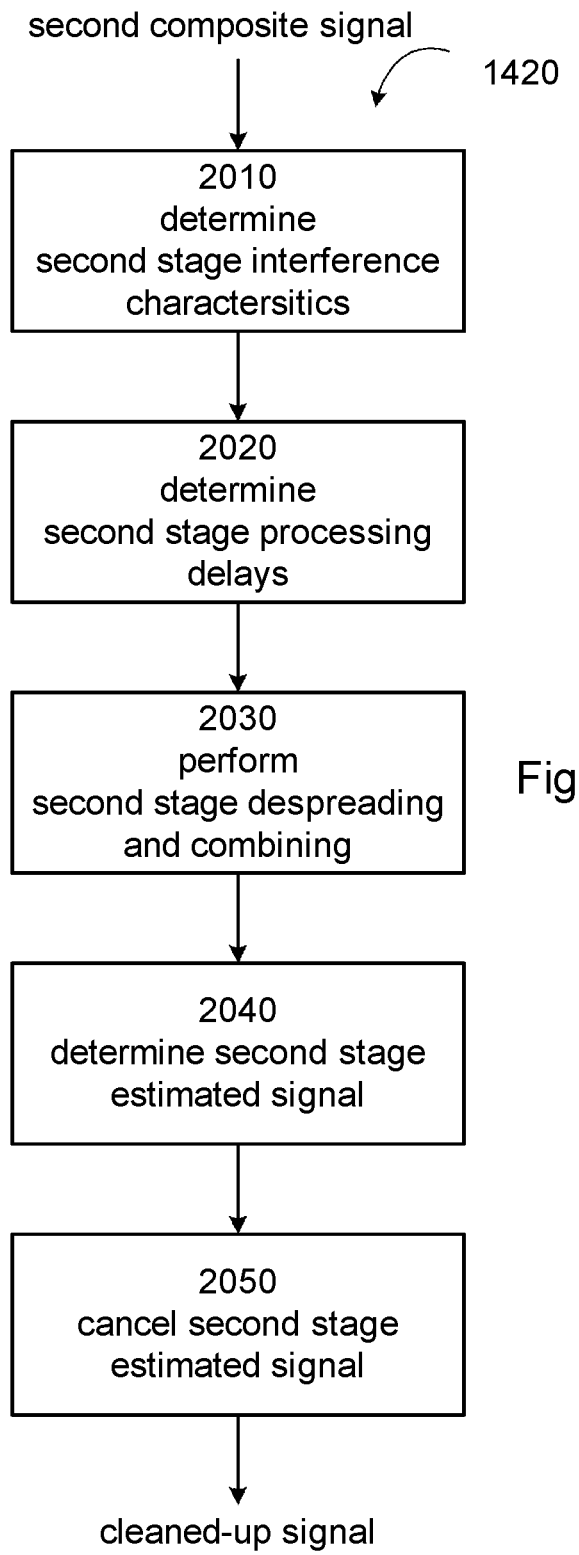
FIG. 20 illustrates a flow chart of an example process to implement a second stage processing of the method for adaptive finger placement.

FIG. 20 illustrates a flow chart of an example process performed by the receiver 400, 800, 1100 to implement the second stage processing 1410 for the symbol of interest contained in the second composite signal. As seen, the equalizer 420 determines in step 2010 one or more second stage interference characteristics based on the second composite signal. This is because the interference characteristics can change as the interferences are cancelled.

The second stage interference can be characterized by correlation function derived from processing the second composite signal. In one aspect, the second stage interference characteristics can be based on data or impairment correlations between one or more pairs of despread values. For example, the second composite signal can be despread using one or more unused codes according one or more finger delays. The second stage interference can be characterized by computing correlations between despread values associated with different finger delays.

The second stage interference can be also be characterized by the interference power levels remaining after the interference cancellation is performed, i.e., by the one or more residual interference power levels left after the first stage processing 1410 or in a previous run of the second stage processing 1420.

Recall from above that the level of interference cancellation can depend on the variance of a regenerated symbol. Also recall that the variance can be approximated by the residual interference power after cancellation. Further recall that the conditional mean can be used as an estimated interfering symbol for cancellation. As seen in equation (9), the impairment covariance matrix after interference cancellation depends on the residual power of the signals.

Figure 21:
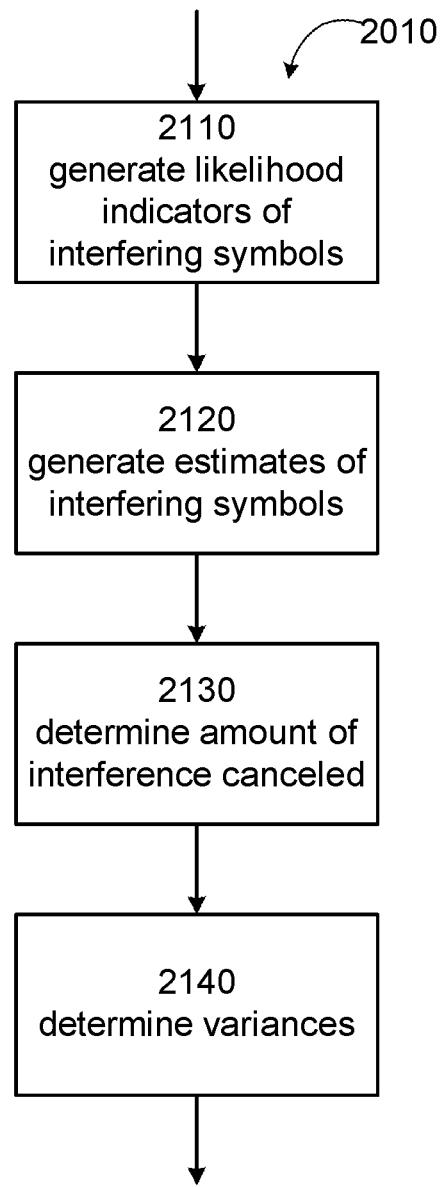
FIG. 21 illustrates a flow chart of an example process to determine second stage interference characteristics.

FIG. 21 illustrates a flow chart of an example process to perform the step 2010. In step 2110, the decoders 440 (see FIG. 4) generate likelihood indicators (soft outputs—e.g., LLRs, bit likelihood ratios, bit probabilities, etc.) corresponding to the interfering symbols based on the demodulated bits from the demodulators 430. Then the signal regenerators 450, and in particular the soft symbol modulators 520, generate estimates of the interfering symbols in step 2120. These estimates, which are conditional means, may be stored in the respective user memories 460. In step 2130, the equalizers 420 determine the amount of interferences that are canceled based on the estimates of the interfering symbols. Then in step 2140, the equalizer 420 determines the residual interference power levels of the interfering symbols. The result is an updated impairment covariance matrix of equation (9) or (10). The process of FIG. 21 in effect obtains the residual interference power levels through computing the variance of interfering symbols regenerated using likelihood indicators in which each likelihood indicator relates to an estimate of a corresponding interfering symbol.

Figure 22A:
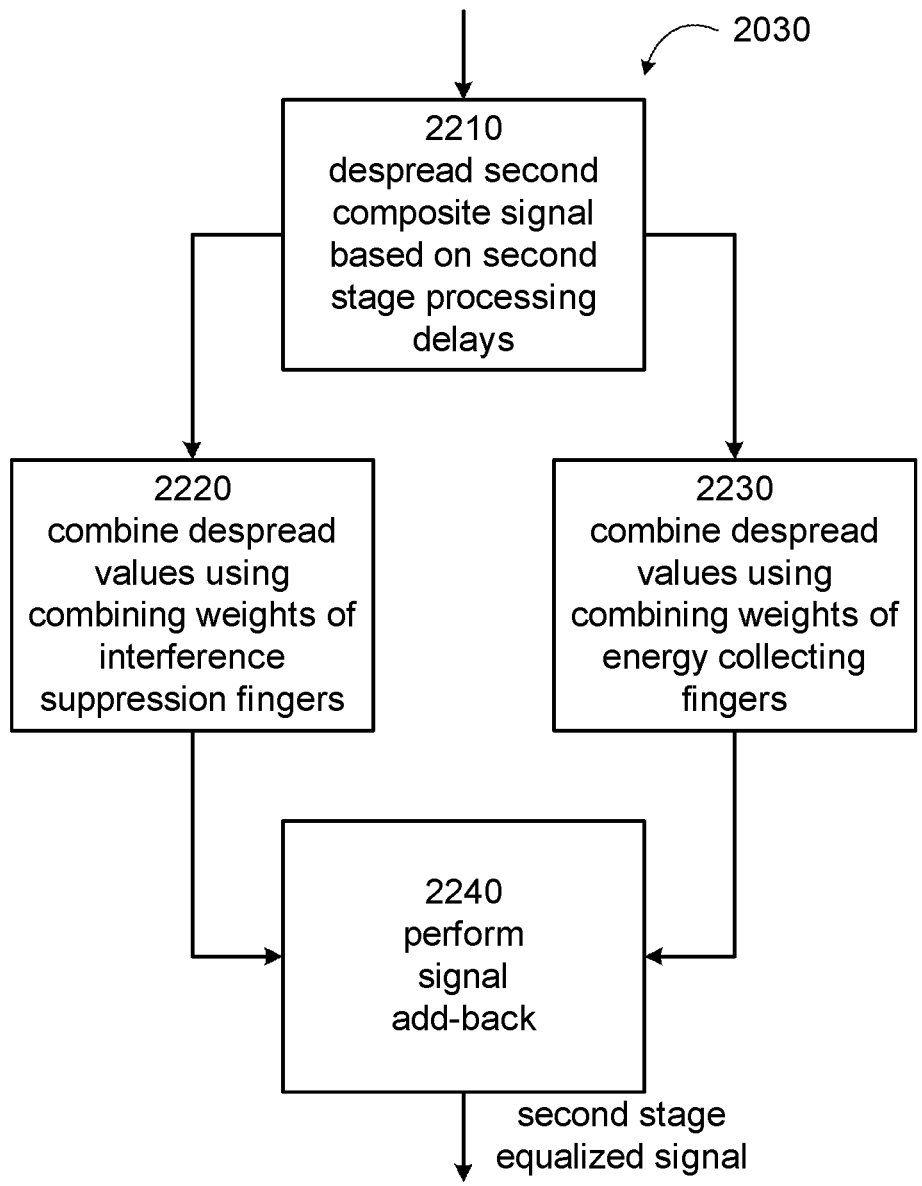
FIGS. 22A and 22B illustrate flow charts of example processes to perform second stage despreading and combining.

Referring back to FIG. 20, after the second stage interference characteristics are determined, the equalizer 420 determines one or more second stage processing delays based on the second stage interference characteristics in step 2020. Then in step 2030, the equalizer 420 performs second stage despreading and combining to generate a second stage equalized signal. FIG. 22A is a flow chart of an example process to implement step 2030. In step 2210, the despreader/combiner 1610 despreads the second composite signal based on the second stage processing delays. Then in step 2220, the despread values are combined based on the second combining weights provided by the combining weight calculator 1640. These can correspond to the Generalized Rake combining weights, which are determined by channel estimate and impairment covariance estimate. The impairment covariance estimate can be obtained by despreading the second composite signal using one or more unused codes. Alternatively or in addition to, the despread values are combined based on the second combining weights provided by the combining weight calculator 1640 corresponding to the energy-collecting fingers in step 2230. These can correspond to the Rake combining weights. In step 2240, a signal add-back can be performed. The equalizer 420 outputs the second stage equalized signal as a result of performing step 2240.

Figure 22B:
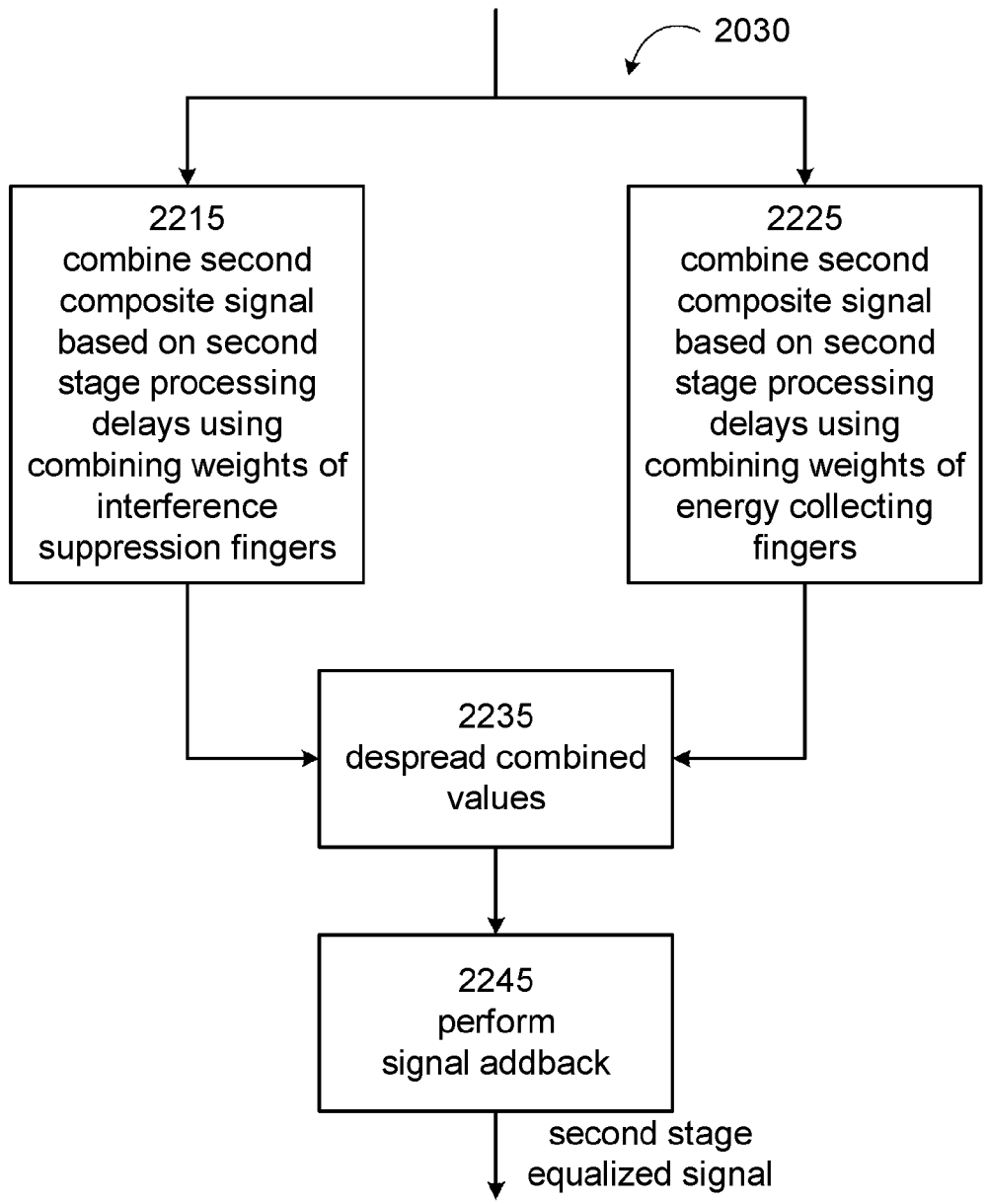

FIG. 22B is a flow chart of another example process to implement step 2030. In step 2215, the despreader/combiner 1610 combines the second composite signal based on the second stage processing delays using the second combining weights corresponding to the interference suppression fingers provided by the combining weight calculator 1640. Alternatively or in addition to, the despreader/combiner 1610 in step 2225 combines the second composite signal based on the second stage processing delays using the second combining weights corresponding to the energy collecting fingers also provided by the combining weight calculator 1640. Then in step 2235, combined values are despread and a signal add-back can be performed in step 2245 to output the second stage equalized signal.

Referring back to FIG. 20, then in step 2040, the receiver 400, 800, 1100 generates a second stage estimated signal of the signal interest based on the second stage equalized signal. In one aspect, the demodulator 430, the decoder 440 and the signal regenerator 450 can perform this step as illustrated in FIG. 23A. In this aspect, the signal regeneration is performed based on soft outputs of the decoder 440. In step 2310, the demodulator 430 demodulates the second stage equalized signal and generates second stage demodulated bit soft values corresponding to the symbols in the second stage equalized signal (symbol of interest and of the interfering symbols). In step 2320, the decoder 440 decodes the second stage demodulated bits to generate first stage likelihood indicators. Then in step 2330, the signal regenerator 450 determines the second stage estimates of the symbols based on the second stage likelihood indicators, and in step 2340, regenerates the second stage estimated signal based on the second stage symbol estimates. An example process to perform the steps 2330 and 2340 is illustrated in FIG. 6.

In another aspect, the demodulator 430 and the signal regenerator 850 can perform the step 2040 as illustrated in FIG. 23B. In this aspect, the pre-decoding signal regeneration is performed based on the hard or soft outputs of the demodulator 430. In step 2312, the demodulator 430 demodulates the second stage equalized signal and generates second stage demodulated bits or likelihood indicators corresponding to the symbols. In step 2332, the signal regenerator 850 determines the second stage estimates of the symbols based on the second stage demodulated bits/LLRs, and in step 2342, regenerates the second stage estimated signal based on the second stage symbol estimates. An example process to perform the steps 2332 and 2342 is illustrated in FIG. 10.

In yet another aspect, the demodulator 430, the decoder 1140 and the signal regenerator 1150 can perform the step 2040 as illustrated in FIG. 23C. In this aspect, the signal regeneration is performed based on hard information bits of the decoder 1140. In step 2314, the demodulator 430 demodulates the second stage equalized signal and generates second stage demodulated bits or likelihood indicators corresponding to the symbols. In step 2324, the decoder 1140 decodes the second stage demodulated bits/LLRs to generate hard information bits. In step 2329, the signal regenerator 1150 reencodes the hard information bits if the CRC passes. Then in step 2334, the signal regenerator 1150 determines the second stage symbol estimates based on the reencoded bits, and in step 2344, regenerates the second stage signal estimate based on the second stage symbol estimates. An example process to perform the steps 2329, 2334 and 2344 is illustrated in FIG. 13.

Referring back to FIG. 20, based on the second stage interferences determined in step 2040, the interference canceller 470 in step 2050 cancels the second stage signal estimate from the second composite signal to generate the further interference-reduced version of the first composite signal. It should be noted that the steps 2040 and 2050 are optional.

One significant advantage of the disclosed subject matter is it allows a turbo-IC receiver to utilize limited amount of despreading resources (fingers) to effectively suppress residual interference in the equalization operation. This can give rise to better performance using the same despreading resources or alternatively the same performance with lower despreading complexity.

Also, the disclosure enables the finger placement strategy to be updated even before new impairment covariance measurement is available after interference cancellation. In fact, the new finger placement can also be applied to obtaining an updated impairment covariance estimate, i.e., the finger delays for despreading the unoccupied codes are also determined by the new finger placement strategy.

Although the description above contains many specificities, these should not be construed as limiting the scope of the disclosed subject matter but as merely providing illustrations of some of the presently preferred embodiments. Therefore, it will be appreciated that the scope of the disclosed subject matter fully encompasses other embodiments which may become obvious to those skilled in the art, and that the scope is accordingly not to be limited. All structural, and functional equivalents to the elements of the above-described preferred embodiment that are known to those of ordinary skill in the art are expressly incorporated herein by reference and are intended to be encompassed hereby. Moreover, it is not necessary for a device or method to address each and every problem described herein or sought to be solved by the present technology, for it to be encompassed hereby.

What is claimed is:

1. A method performed in a receive node of a communication network, the receive node being structured to operate on a data stream transmitted from a transmit node, the method comprising:
    performing, by the receive node, a first stage processing a symbol of interest contained in a first composite signal; and
    performing, by the receive node, a second stage processing the same symbol of interest contained in a second composite signal,
    wherein the first stage processing comprises:
        determining one or more first stage interference characteristics based on the first composite signal;
        determining one or more first stage processing delays based on the first stage interference characteristics;
        performing a first stage despreading and combining of the first composite signal based on the first stage processing delays to generate a first stage equalized signal;
        determining a first stage estimated signal based on the first stage equalized signal;
        canceling the first stage estimated signal from the first composite signal to generate an interference-reduced version of the first composite signal, and
    wherein the second stage processing comprises:
        determining one or more second stage processing delays; and
        performing a second stage despreading and combining of the second composite signal based on the second stage processing delays to generate a second stage equalized signal,
    wherein the second composite signal is based on the interference-reduced version of the first composite signal.

2. The method of claim 1, wherein the second stage processing further comprises determining one or more second stage interference characteristics based on the second composite signal.

3. The method of claim 2, wherein the step of determining the second stage processing delays comprises determining the second stage processing delays based on the second stage interference characteristics.

4. The method of claim 3, wherein the step of performing the second stage despreading and combining comprises:
despreading the second composite signal based on the second stage processing delays; and
combining the second stage despread values using combining weights corresponding to one or more interference-suppression fingers.

5. The method of claim 4, wherein the combining weights corresponding to the interference-suppression fingers are Generalized Rake combining weights.

6. The method of claim 2, wherein the step of determining the second stage interference characteristics comprises determining the second stage interference characteristics based on data or impairment correlation between one or more pairs of despread values.

7. The method of claim 2, wherein the step of determining the second stage interference characteristics comprises determining the second stage interference characteristics based on one or more residual interference power levels.

8. The method of claim 7, wherein the residual interference power levels are obtained through computing a variance of interfering symbols regenerated using likelihood indicators wherein each likelihood indicator relates to an estimate of a corresponding interfering symbol.

9. The method of claim 8, wherein each likelihood indicator is any one or more of bit log-likelihood ratios (LLR), bit likelihood ratios, and bit probabilities of the interfering symbol corresponding to that likelihood indicator.

10. The method of claim 1, wherein the step of performing the second stage despreading and combining comprises:
despreading the second composite signal based on the second stage processing delays; and
combining the second stage despread values using combining weights corresponding to one or more energy-collecting fingers.

11. The method of claim 10, wherein the combining weights corresponding to the energy-collecting fingers are Rake combining weights.

12. The method of claim 1, wherein the step of performing the first stage despreading and combining of the first composite signal based on the first stage processing delays comprises:
despreading the first composite signal based on the first stage processing delays; and
combining the despread values using first combining weights.

13. The method of claim 1, wherein the step of performing the first stage despreading and combining of the first composite signal based on the first stage processing delays comprises:
combining the first composite signal based on the first stage processing delays and first combining weights; and
despreading the combined values.

14. The method of claim 1, wherein the step of determining the first stage estimated signal comprises:
determining the first stage estimates of the symbol of interest and of the interfering symbols in the first composite signal based on any one of likelihood indicators generated by a decoder, hard demodulated bits generated by a demodulator, soft demodulated indicators generated by the demodulator, and reencoded hard decoded bits generated by the decoder; and
regenerating an estimate of the signal of interest as the first stage estimated signal based on the first stage estimates of the symbol of interest and of the interfering symbols.

15. The method of claim 1, wherein the step of determining the second stage interfering symbol estimate comprises:
determining the second stage estimates of the symbol of interest and of the interfering symbols in the second composite signal based on any one of likelihood indicators generated by a decoder, hard demodulated bits generated by a demodulator, soft demodulated indicators generated by the demodulator, and reencoded hard decoded bits generated by the decoder; and
regenerating an estimate of the signal of interest as the second stage estimated signal based on the second stage estimates of the symbol of interest and of the interfering symbols.

16. A receiver of a receive node of a communication network comprising a plurality of chains, each chain structured to process a symbol of interest contained in a first composite signal in a first stage, and to process the same symbol of interest contained in a second composite signal in a second stage, each chain of the receiver comprising:
an equalizer;
a demodulator;
a signal regenerator; and
an interference canceller,
wherein in the first stage,
the equalizer is structured to determine one or more first stage interference characteristics based on the first composite signal, to determine one or more first stage processing delays based on the first stage interference characteristics, and to perform a first stage despreading and combining of the first composite signal based on the first stage processing delays to generate a first stage equalized signal,
the demodulator is structured to demodulate the first equalized signal to generate a first stage demodulated data,
the signal regenerator is structured to determine a first stage estimated signal based on the first stage demodulated data, and
the interference canceller is structured to cancel the first stage estimated signal from the first composite signal to generate an interference-reduced version of the first composite signal,
wherein in the second stage, the equalizer is structured to determine one or more second stage processing delays, and to perform a second stage despreading and combining of the second composite signal based on the second stage processing delays to generate a second stage equalized signal, and
wherein the second composite signal is based on the interference-reduced version of the first composite signal.

17. The receiver of claim 16, wherein in the second stage, the equalizer is structured to determine one or more second stage interference characteristics based on the second composite signal.

18. The receiver of claim 17, wherein the equalizer comprises a delay timing determiner structured to determine the second stage processing delays based on the second stage interference characteristics.

19. The receiver of claim 18, wherein the equalizer further comprises:
a combining weight calculator structured to calculate combining weights of fingers of a despreader/combiner, and
the despreader/combiner structured to despread the second composite signal based on the second stage processing delays, and combining the second stage despread values using combining weights from the combining weight calculator, wherein the combining weights correspond to one or more interference-suppression fingers of the despreader/combiner.

20. The receiver of claim 19, wherein the combining weights corresponding to the interference-suppression fingers are Generalized Rake combining weights.

21. The receiver of claim 17, wherein the equalizer is structured to determine the second stage interference characteristics based on data or impairment correlation between one or more pairs of despread values.

22. The receiver of claim 17, wherein the equalizer is structured to determine the second stage interference characteristics based on one or more residual interference power levels.

23. The receiver of claim 22, wherein the equalizer is structured to obtain the residual interference power levels through computing a variance of interfering symbols regenerated using likelihood indicators wherein each likelihood indicator relates to an estimate of a corresponding interfering symbol.

24. The receiver of claim 23, wherein each likelihood indicator is any one or more of bit log-likelihood ratios (LLR), bit likelihood ratios, and bit probabilities of the interfering symbol corresponding to that likelihood indicator.

25. The receiver of claim 16, wherein the equalizer further comprises:

a combining weight calculator structured to calculate combining weights of fingers of a despreader/combiner, and the despreader/combiner structured to despread the second composite signal based on the second stage processing delays, and combining the second stage despread values using combining weights from the combining weight calculator, wherein the combining weights correspond to one or more energy-collecting fingers of the despreader/combiner.

26. The receiver of claim 25, wherein the combining weights corresponding to the energy-collecting fingers are Rake combining weights.

27. The receiver of claim 16, wherein the despreader/combiner is structured to despread the first composite signal based on the first stage processing delays, and combine the despread values using first combining weights.

28. The receiver of claim 16, wherein the despreader/combiner is structured to combine the first composite signal based on the first stage processing delays and first set of combining weights, and despread the combined values.

29. The receiver of claim 16, wherein in the first stage, the signal regenerator determines the first stage estimate of the symbol of interest and of the interfering symbols in the first composite signal based on any one of likelihood indicators generated by a decoder, hard demodulated bits generated by a demodulator, soft demodulated indicators generated by the demodulator, and reencoded hard decoded bits generated by the decoder, and regenerates an estimate of the signal of interest as the first stage estimated signal based on the first stage estimates of the symbol of interest and of the interfering symbols.

30. The receiver of claim 16, wherein in the second stage, the signal regenerator determines the second stage estimates of the symbol of interest and of the interfering symbols in the second composite signal based on any one of likelihood indicators generated by a decoder, hard demodulated bits generated by a demodulator, soft demodulated indicators generated by the demodulator, and reencoded hard decoded bits generated by the decoder; and regenerates an estimate of the signal of interest as the second stage estimated signal based on the second stage estimates of the symbol of interest and of the interfering symbols.

31. A non-transitory computer readable medium containing therein a program executable by a computer in a receive node of a communication network, when executed, the program causing the computer to perform a first stage processing a symbol of interest contained in a first composite signal, and to perform a second stage processing the same symbol of interest contained in a second composite signal, wherein the first stage processing comprises:

determining one or more first stage interference characteristics based on the first composite signal;

determining one or more first stage processing delays based on the first stage interference characteristics;

performing a first stage despreading and combining of the first composite signal based on the first stage processing delays to generate a first stage equalized signal;

determining a first stage estimated signal based on the first stage equalized signal;

canceling the first stage estimated signal from the first composite signal to generate an interference-reduced version of the first composite signal, and wherein the second stage processing comprises:

determining one or more second stage processing delays; and performing a second stage despreading and combining of the second composite signal based on the second stage processing delays to generate a second stage equalized signal, wherein the second composite signal is based on the interference-reduced version of the first composite signal.

32. The non-transitory computer readable medium of claim 31, wherein the second stage processing further comprises determining one or more second stage interference characteristics based on the second composite signal, wherein the step of determining the second stage interference characteristics comprises determining the second stage interference characteristics based on one or more residual interference power levels, wherein the residual interference power levels are obtained through computing a variance of interfering symbols regenerated using likelihood indicators, and wherein each likelihood indicator relates to an estimate of a corresponding interfering symbol.

33. The non-transitory computer readable medium of claim 31, wherein the step of determining the first stage estimated signal comprises:

determining the first stage estimates of the symbol of interest and of the interfering symbols in the first composite signal based on any one of likelihood indicators generated by a decoder, hard demodulated bits generated by a demodulator, soft demodulated indicators generated by the demodulator, and reencoded hard decoded bits generated by the decoder; and regenerating an estimate of the signal of interest as the first stage estimated signal based on the first stage estimates of the symbol of interest and of the interfering symbols.

34. The non-transitory computer readable medium of claim 31, wherein the step of determining the second stage interfering symbol estimate comprises:

determining the second stage estimates of the symbol of interest and of the interfering symbols in the second composite signal based on any one of likelihood indicators generated by a decoder, hard demodulated bits generated by a demodulator, soft demodulated indicators generated by the demodulator, and reencoded hard decoded bits generated by the decoder; and regenerating an estimate of the signal of interest as the second stage estimated signal based on the second stage estimates of the symbol of interest and of the interfering symbols.

\* \* \* \* \*

UNITED STATES PATENT AND TRADEMARK OFFICE
CERTIFICATE OF CORRECTION

PATENT NO. : 8,787,426 B2  
APPLICATION NO. : 13/333703  
DATED : July 22, 2014  
INVENTOR(S) : Wang et al.

Page 1 of 1

It is certified that error appears in the above-identified patent and that said Letters Patent is hereby corrected as shown below:

In the Specification

In Column 12, Line 57, delete " $\sigma_{\bar{s},j}{}^2 0,$ " and insert -- $\sigma_{\bar{s},j}^2 = 0,$ --, therefor.

In Column 12, Line 64, delete " $\bar{s}_j(k,i) = E[s_j(k,i) | I_j(,i)] |,$ " and insert -- $\bar{s}_j(k,i) = E[s_j(k,i) | 1_j(k,i)] |,$ --, therefor.

Signed and Sealed this  
Twelfth Day of May, 2015

Michelle K. Lee  
*Director of the United States Patent and Trademark Office*